United States Patent
Yang et al.

(10) Patent No.: US 12,225,540 B2
(45) Date of Patent: Feb. 11, 2025

(54) METHOD FOR SWITCHING BWP FOR SIDELINK COMMUNICATION, AND COMMUNICATION DEVICE

(71) Applicant: LG ELECTRONICS INC., Seoul (KR)

(72) Inventors: Yoonoh Yang, Seoul (KR); Jinyup Hwang, Seoul (KR); Sangwook Lee, Seoul (KR); Suhwan Lim, Seoul (KR); Manyoung Jung, Seoul (KR); Jongkeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 365 days.

(21) Appl. No.: 17/632,133

(22) PCT Filed: Aug. 5, 2020

(86) PCT No.: PCT/KR2020/010293
§ 371 (c)(1),
(2) Date: Feb. 1, 2022

(87) PCT Pub. No.: WO2021/029592
PCT Pub. Date: Feb. 18, 2021

(65) Prior Publication Data
US 2022/0279485 A1    Sep. 1, 2022

(30) Foreign Application Priority Data

Aug. 12, 2019 (KR) .................. 10-2019-0098436
Aug. 12, 2019 (KR) .................. 10-2019-0098439
Aug. 14, 2019 (KR) .................. 10-2019-0099540

(51) Int. Cl.
*H04W 72/23* (2023.01)
*H04W 72/04* (2023.01)
(Continued)

(52) U.S. Cl.
CPC .......... *H04W 72/23* (2023.01); *H04W 72/04* (2013.01); *H04W 72/02* (2013.01); *H04W 72/044* (2013.01); *H04W 92/18* (2013.01)

(58) Field of Classification Search
CPC ..................... H04W 72/23–232; H04W 72/04
See application file for complete search history.

(56) References Cited

U.S. PATENT DOCUMENTS

2019/0104543 A1   4/2019 Park
2019/0149380 A1   5/2019 Babaei et al.
(Continued)

FOREIGN PATENT DOCUMENTS

| CN | 201910028828.0 | * 11/2019 |
| CN | 201910249126.5 | * 11/2019 |
| KR | 10-2015-0082558 | 7/2015 |

OTHER PUBLICATIONS

Partial translation of Chinese Patent Application 201910249126.5. (Year: 2019).*

(Continued)

*Primary Examiner* — Kevin C. Harper
(74) *Attorney, Agent, or Firm* — LEE, HONG, DEGERMAN, KANG & WAIMEY

(57) ABSTRACT

Provided in one embodiment of the present specification is a method for switching a bandwidth part (BWP) for sidelink communication. The method can comprise the steps of: receiving information about a bandwidth part (BWP) switching timing from a base station; and switching a BWP on the basis of the information about the BWP switching timing. The information about the BWP switching timing can include information about the point of time at which the BWP switching should be started after the information has been received. The information about the BWP switching (Continued)

timing can be received through downlink control information (DCI) or a radio resource control (RRC) signal.

7 Claims, 31 Drawing Sheets

(51) Int. Cl.
*H04W 72/02* (2009.01)
*H04W 72/044* (2023.01)
*H04W 92/18* (2009.01)

(56) References Cited

U.S. PATENT DOCUMENTS

| | | | | |
|---|---|---|---|---|
| 2019/0268918 | A1* | 8/2019 | Baghel | H04W 72/54 |
| 2019/0373667 | A1* | 12/2019 | Jeon | H04W 72/23 |
| 2020/0351067 | A1* | 11/2020 | Hui | H04L 5/001 |
| 2021/0337517 | A1* | 10/2021 | Li | H04W 72/02 |

OTHER PUBLICATIONS

PCT International Application No. PCT/KR2020/010293, International Search Report dated Nov. 3, 2020, 4 pages.
Vivo, "Physical layer structure for NR sidelink," R1-1904072, 3GPP TSG RAN WG1 #96bis Meeting, Apr. 2019, 15 pages.
Intel Corporation, "Sidelink Physical Structure for NR V2X Communication," R1-1907906, 3GPP TSG RAN WG1 Meeting #97, May 2019, 23 pages.

* cited by examiner

METHOD FOR SWITCHING BWP FOR SIDELINK COMMUNICATION, AND COMMUNICATION DEVICE

CROSS-REFERENCE TO RELATED APPLICATIONS

This application is the National Stage filing under 35 U.S.C. 371 of International Application No. PCT/KR2020/010293, filed on Aug. 5, 2020, which claims the benefit of earlier filing date and right of priority to Korean Application Nos. 10-2019-0098436 filed on Aug. 12, 2019, 10-2019-0098439 filed on Aug. 12, 2019, and 10-2019-0099540 filed on Aug. 14, 2019, the contents of all of which are hereby incorporated by reference herein in their entireties.

The present specification relates to mobile communications.

BACKGROUND

With the success of long term evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

For the 5G mobile communication, new radio access technology (new RAT or NR) has been researched.

The fifth-generation communication defined by the international telecommunication union (ITU) refers to providing a maximum data transmission speed of 20 Gbps and a maximum transmission speed of 100 Mbps per user in anywhere. It is officially called "IMT-2020" and aims to be released around the world in 2020.

Meanwhile, LTE/LTE-A technology and NR technology may also be used for vehicle communication. This is called vehicle-to-everything (V2X). Communication technology through all interfaces with the vehicle is commonly called V2X.

Communication between V2X devices without going through a base station is called V2X communication, and a link used for communication between V2X devices is also called a sidelink.

Meanwhile, a sidelink for device to device (D2D) communication or vehicle to everything (V2X) communication may be configured to operate on a BWP different from a bandwidth part (BWP) for uplink. In this case, in order for the UE (ie, the wireless communication device) to use the sidelink, it must change from the first BWP for the uplink to the second BWP for the sidelink, resulting in a time delay, which is problem.

SUMMARY

Therefore, the disclosure of the present specification is to propose method for solving the above-mentioned problems.

In order to solve the above problems, one disclosure of the present specification provides a method for switching BWP (bandwidth part) for sidelink communication, performed by a UE (user equipment). The method comprises: receiving information on BWP switching timing from base station; and performing BWP switching, based on the information on BWP switching timing, wherein the information on BWP switching timing includes information on time point when the UE should start the BWP switching, the time point is after the information on BWP switching timing is received.

Wherein the information on BWP switching timing includes i) first information on when the UE should start switching to BWP for sidelink and ii) second information on when the UE should start switching to the BWP for the Uu link with the base station.

The method may comprise: performing switching to BWP for sidelink; and performing switching to BWP for Uu link with the base station.

The method may comprise: stopping transmission and reception with the base station for specific time, the BWP switching is performed.

The specific time is included in BWP time delay ($T_{SLBWPswitchingDelay}$).

In order to solve the above problems, one disclosure of the present specification provides a communication device comprising: at least one processor; and at least one memory for storing instructions and operably electrically connectable with the at least one processor, wherein the instructions are executed based on execution by the at least one processor, performed operation comprising: receiving information on BWP switching timing from base station; and performing BWP switching, based on the information on BWP switching timing, wherein the information on BWP switching timing includes information on time point when the UE should start the BWP switching, the time point is after the information on BWP switching timing is received.

In order to solve the above problems, one disclosure of the present specification provides a chipset equipped in a communication device, comprising: at least one processor; at least one memory for storing instructions and operably electrically connectable with the at least one processor, based on the instructions being operated by the at least one processor, performed operation comprising: receiving information on BWP switching timing from base station; and performing BWP switching, based on the information on BWP switching timing, wherein the information on BWP switching timing includes information on time point when the UE should start the BWP switching, the time point is after the information on BWP switching timing is received.

In order to solve the above problems, one disclosure of the present specification provides a non-volatile computer readable storage medium having recorded instructions, wherein the instructions, based on being executed by one or more processors, cause the one or more processors to: receive information on BWP switching timing from base station; and perform BWP switching, based on the information on BWP switching timing, wherein the information on BWP switching timing includes information on time point when the UE should start the BWP switching, the time point is after the information on BWP switching timing is received.

In order to solve the above problems, one disclosure of the present specification provides a method for switching BWP (bandwidth part) for sidelink communication, performed by a base station, comprising: configuring information on BWP (bandwidth part) switching timing; and transmitting the information on the BWP switching timing to a UE (user equipment), wherein the information on BWP switching timing includes information on time point when the UE should start the BWP switching, the time point is after the information on BWP switching timing is received.

Therefore, the disclosure of the present specification is to propose method for solving the above-mentioned problems.

DETAILED DESCRIPTION

Figure 1:
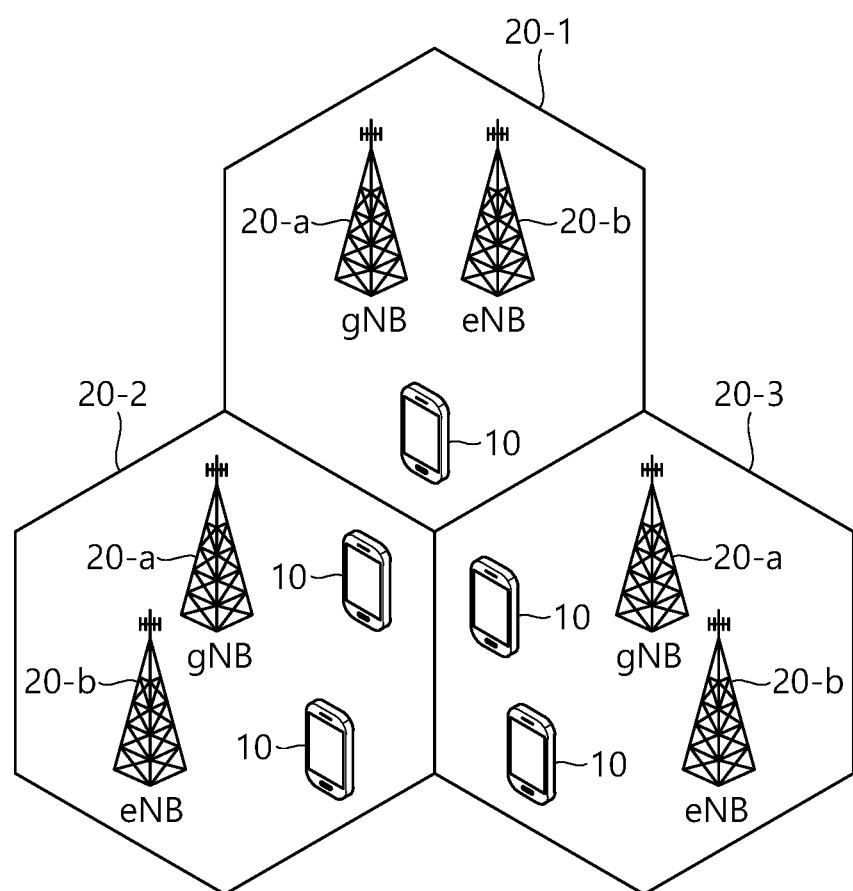
FIG. 1 is a wireless communication system.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are individually described in one drawing in this specification may be implemented individually or simultaneously.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Hereinafter, the UE is used as an example of a device capable of wireless communication (e.g., a wireless communication device, a wireless device, or a wireless device). The operation performed by the UE may be performed by any device capable of wireless communication. A device capable of wireless communication may also be referred to as a wireless communication device, a wireless device, or a wireless device.

A base station, a term used below, generally refers to a fixed station that communicates with a wireless device, which may be called other terms such as an evolved-NodeB (eNodeB), an evolved-NodeB (eNB), a BTS (Base Transceiver System), an access point (Access Point), gNB (Next generation NodeB).

FIG. 1 is a wireless communication system.

As can be seen with reference to FIG. 1, a wireless communication system includes at least one base station (BS). The BS is divided into a gNodeB (or gNB) 20*a* and an eNodeB (or eNB) 20*b*. The gNB 20*a* supports 5G mobile communication. The eNB 20*b* supports 4G mobile communication, that is, long term evolution (LTE).

Each base station 20*a* and 20*b* provides a communication service for a specific geographic area (commonly referred to as a cell) (20-1, 20-2, 20-3). A cell may in turn be divided into a plurality of regions (referred to as sectors).

A UE typically belongs to one cell, and the cell to which the UE belongs is called a serving cell. A base station providing a communication service to a serving cell is referred to as a serving base station (serving BS). Since the wireless communication system is a cellular system, other cells adjacent to the serving cell exist. The other cell adjacent to the serving cell is referred to as a neighbor cell. A base station that provides a communication service to a neighboring cell is referred to as a neighbor BS. The serving cell and the neighboring cell are relatively determined based on the UE.

Hereinafter, downlink means communication from the base station (20) to the UE (10), and uplink means communication from the UE (10) to the base station (20). In the downlink, the transmitter may be a part of the base station (20), and the receiver may be a part of the UE (10). In the uplink, the transmitter may be a part of the UE (10), and the receiver may be a part of the base station (20).

Meanwhile, a wireless communication system may be largely divided into a frequency division duplex (FDD) scheme and a time division duplex (TDD) scheme. According to the FDD scheme, uplink transmission and downlink transmission are performed while occupying different frequency bands. According to the TDD scheme, uplink transmission and downlink transmission are performed at different times while occupying the same frequency band. The channel response of the TDD scheme is substantially reciprocal. This means that the downlink channel response and the uplink channel response are almost the same in a given frequency domain. Accordingly, in the TDD-based wireless communication system, there is an advantage that the downlink channel response can be obtained from the uplink channel response. In the TDD scheme, since uplink transmission and downlink transmission are time-divided in the entire frequency band, downlink transmission by the base station and uplink transmission by the UE cannot be simultaneously performed. In a TDD system in which uplink transmission and downlink transmission are divided in subframe units, uplink transmission and downlink transmission are performed in different subframes.

Hereinafter, the LTE system will be described in more detail.

Figure 2:
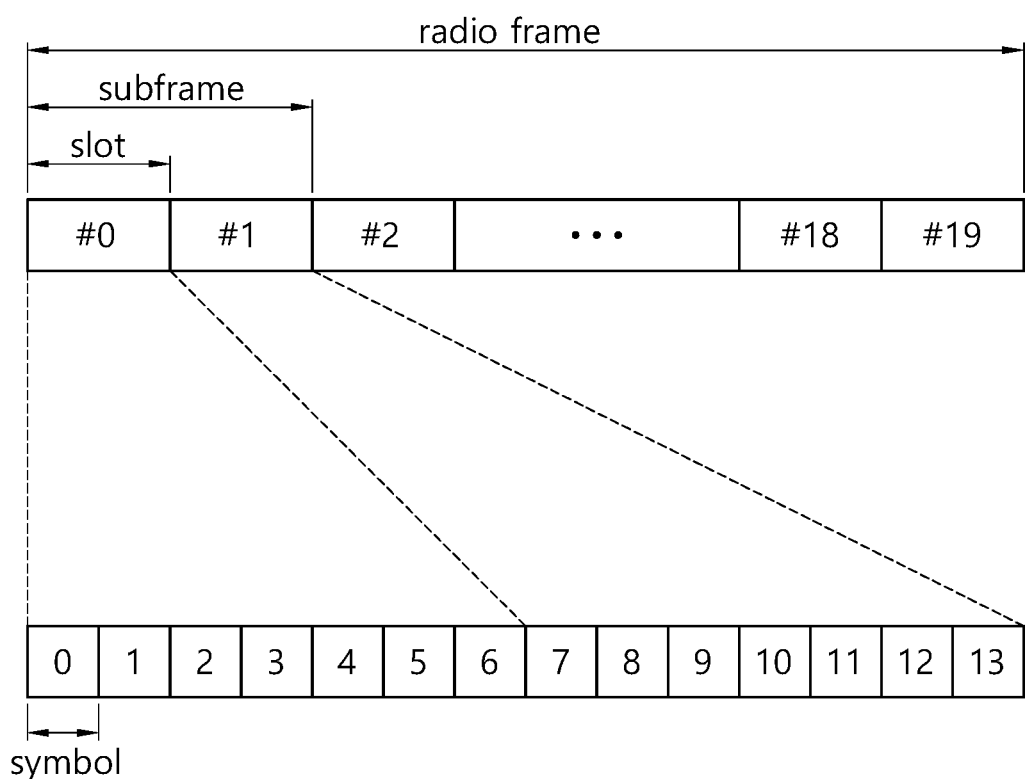
FIG. 2 shows the structure of a radio frame according to FDD in 3GPP LTE.

FIG. 2 shows the structure of a radio frame according to FDD in 3GPP LTE.

Referring to FIG. 2, a radio frame includes 10 subframes, and one subframe includes two slots. The slots in the radio frame are numbered from 0 to 19. The time it takes for one subframe to be transmitted is referred to as a transmission time interval (TTI). The TTI may be referred to as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame or the number of slots included in the subframe may be variously changed.

Meanwhile, one slot may include a plurality of orthogonal frequency division multiplexing (OFDM) symbols. How many OFDM symbols are included in one slot may vary according to a cyclic prefix (CP).

One slot includes NAB resource blocks (RBs) in a frequency domain. For example, in the LTE system, the number of resource blocks (RBs), that is, NRB may be any one of 6 to 110.

A resource block (RB) is a resource allocation unit and includes a plurality of subcarriers in one slot. For example, if one slot includes 7 OFDM symbols in the time domain and the resource block includes 12 subcarriers in the frequency domain, one resource block may include 7*12 resource elements (REs).

In 3GPP LTE, physical channels are divided into data channels, such as PDSCH (Physical Downlink Shared Channel) and PUSCH (Physical Uplink Shared Channel), and control channels, such as PDCCH (Physical Downlink Control Channel), PCFICH (Physical Control Format Indicator Channel), PHICH (Physical Hybrid-ARQ Indicator Channel) and PUCCH (Physical Uplink Control Channel).

The uplink channel includes PUSCH, PUCCH, SRS (Sounding Reference Signal), and PRACH (Physical Random Access Channel).

<Next-Generation Mobile Communication Network>

Thanks to the success of LTE (long term evolution)/LTE-Advanced (LTE-A) for 4th generation mobile communication, interest in next-generation, that is, 5th generation (so-called 5G) mobile communication is increasing, and research is being conducted one after another.

5G mobile communication, defined by the International Telecommunication Union (ITU), refers to providing a data transmission rate of up to 20 Gbps and a perceived transmission speed of at least 100 Mbps anywhere. The official name is 'IMT-2020', and it aims to commercialize it worldwide in 2020.

The ITU proposes three usage scenarios, for example, eMBB (enhanced Mobile BroadBand), mMTC (massive Machine Type Communication) and URLLC (Ultra Reliable and Low Latency Communications).

URLLC relates to usage scenarios that require high reliability and low latency. For example, services such as autonomous driving, factory automation, and augmented reality require high reliability and low latency (e.g., latency of 1 ms or less). Currently, the delay time of 4G (LTE) is statistically 21-43 ms (best 10%) and 33-75 ms (median). This is insufficient to support services requiring latency of less than 1 ms. Next, the eMBB usage scenario relates to a usage scenario requiring mobile ultra-wideband.

That is, the 5th generation mobile communication system may target higher capacity than the current 4G LTE, increase the density of mobile broadband users, and support D2D (Device to Device), high stability, and MTC (Machine type communication). 5G R&D also aims to achieve lower latency and lower battery consumption than 4G mobile communication systems to better realize the Internet of Things. For such 5G mobile communication, a new radio access technology (New RAT or NR) may be proposed.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

<Operation Bands in NR>

The operating bands in NR are as follows.

The operating band of Table 3 below is an operating band converted from the operating band of LTE/LTE-A. This is called the FR1 band.

TABLE 3

| NR operation bands | Uplink operation bands $F_{UL\_low}$-$F_{UL\_high}$ | Downlink operation bands $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The table below shows the NR operating bands defined on the high frequency phase. This is called the FR2 band.

TABLE 4

| NR operation bands | Uplink operation bands $F_{UL\_low}$-$F_{UL\_high}$ | Downlink operation bands $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |
| n260 | 37000 MHz-40000 MHz | 37000 MHz-40000 MHz | FDD |
| n261 | 27500 MHz-28350 MHz | 27500 MHz-28350 MHz | FDD |

Figure 3A:
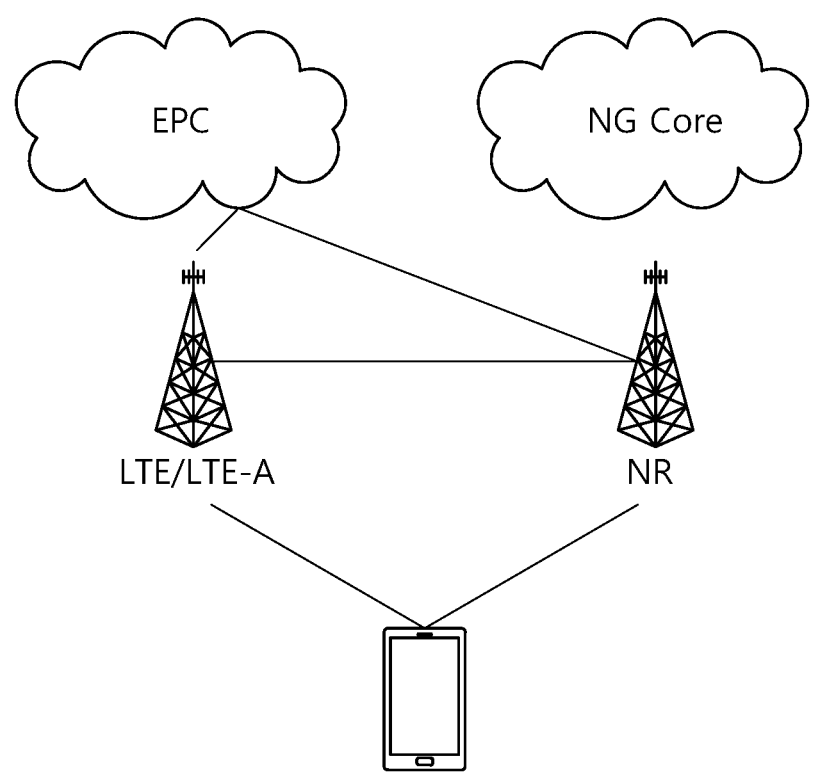
FIGS. 3a to 3c are exemplary diagrams illustrating an exemplary architecture for a service of next-generation mobile communication.
Figure 3B:
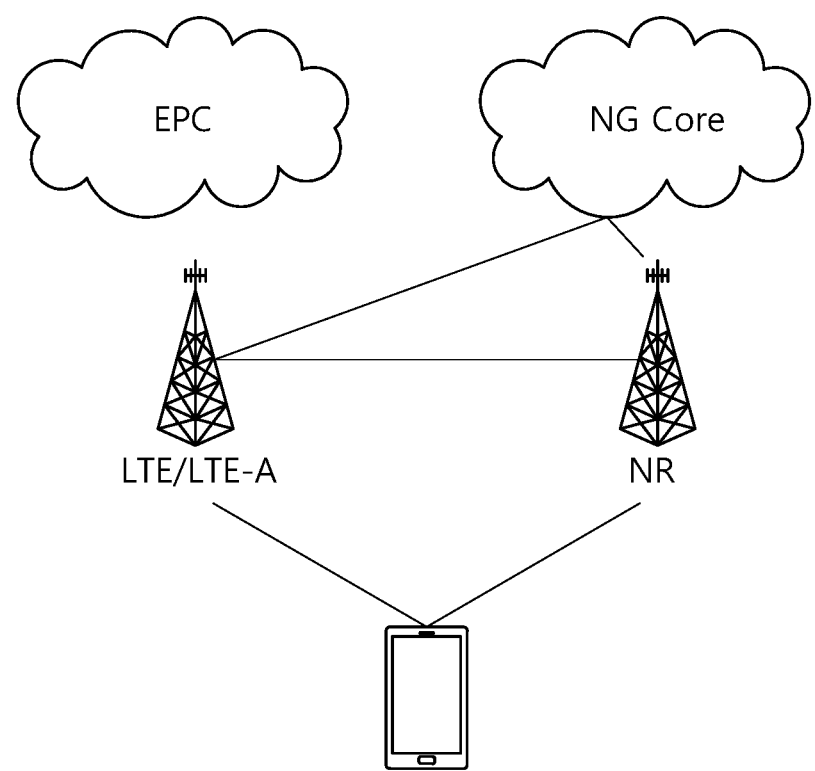
Figure 3C:
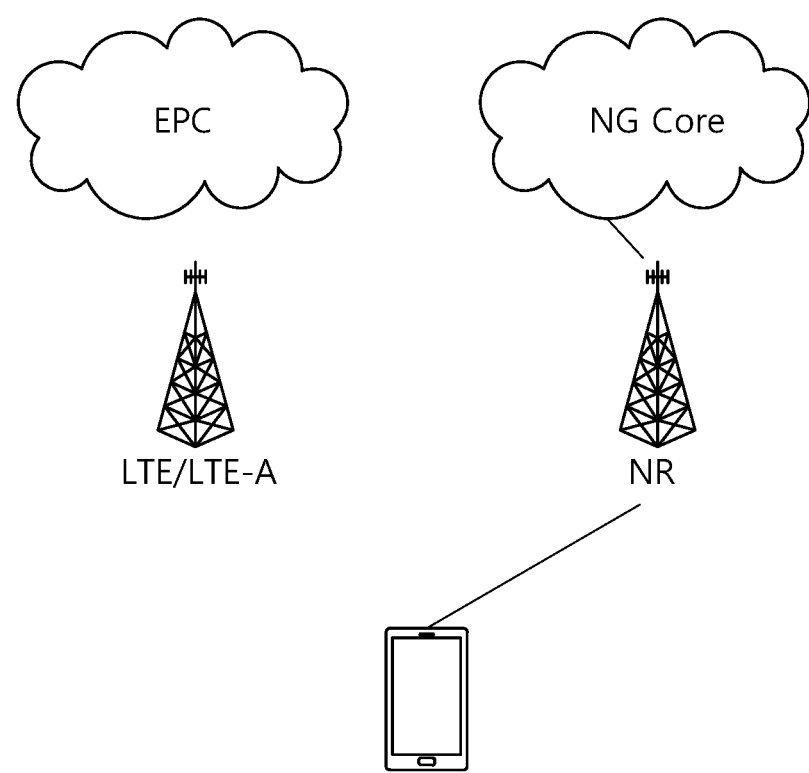

FIGS. 3a to 3c are exemplary diagrams illustrating an exemplary architecture for a service of next-generation mobile communication.

Referring to FIG. 3a, the UE is connected to the LTE/LTE-A-based cell and the NR-based cell in a DC (dual connectivity) manner.

The NR-based cell is connected to a core network for the existing 4G mobile communication, that is, the NR-based cell is connected an Evolved Packet Core (EPC).

Referring to FIG. 3b, unlike FIG. 3a, an LTE/LTE-A-based cell is connected to a core network for 5G mobile communication, that is, the LTE/LTE-A-based cell is connected to a Next Generation (NG) core network.

A service method based on the architecture shown in FIG. 3a and FIG. 3b is referred to as NSA (non-standalone).

Referring to FIG. 3c, UE is connected only to an NR-based cell. A service method based on this architecture is called SA (standalone).

Meanwhile, in the NR, it may be considered that reception from a base station uses downlink subframe, and transmission to a base station uses uplink subframe. This method can be applied to paired and unpaired spectra. A pair of spectrum means that two carrier spectrums are included for downlink and uplink operation. For example, in a pair of spectrums, one carrier may include a downlink band and an uplink band that are paired with each other.

Figure 4:
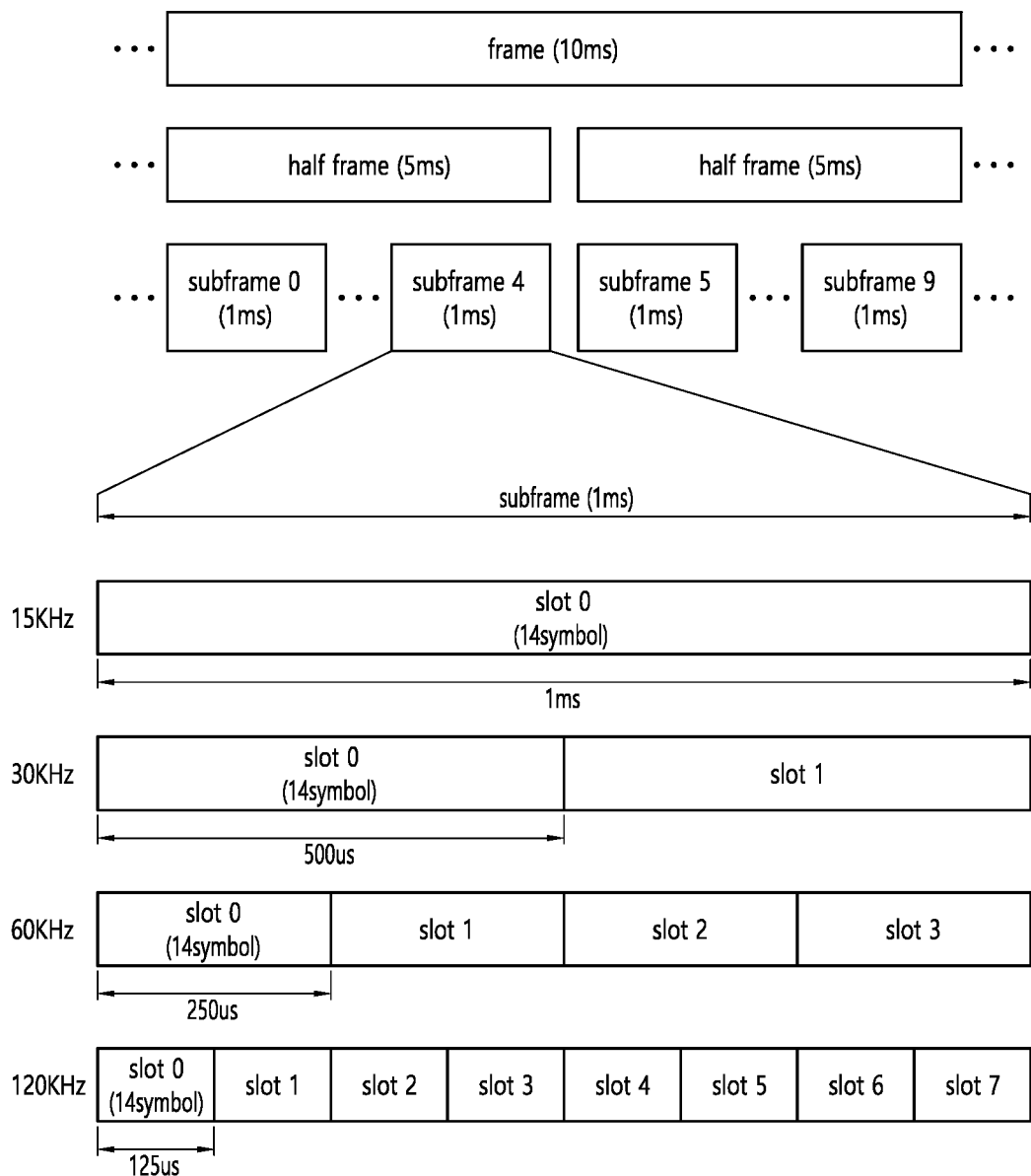
FIG. 4 illustrates structure of a radio frame used in NR.

FIG. 4 illustrates structure of a radio frame used in NR.

In NR, uplink and downlink transmission consists of frames. A radio frame has a length of 10 ms and is defined as two 5 ms half-frames (Half-Frame, HF). A half-frame is defined as 5 1 ms subframes (Subframe, SF). A subframe is divided into one or more slots, and the number of slots in a subframe depends on SCS (Subcarrier Spacing). Each slot includes 12 or 14 OFDM(A) symbols according to CP (cyclic prefix). When CP is usually used, each slot includes 14 symbols. When the extended CP is used, each slot includes 12 symbols. Here, the symbol may include an OFDM symbol (or a CP-OFDM symbol) and an SC-FDMA symbol (or a DFT-s-OFDM symbol).

Figure 5:
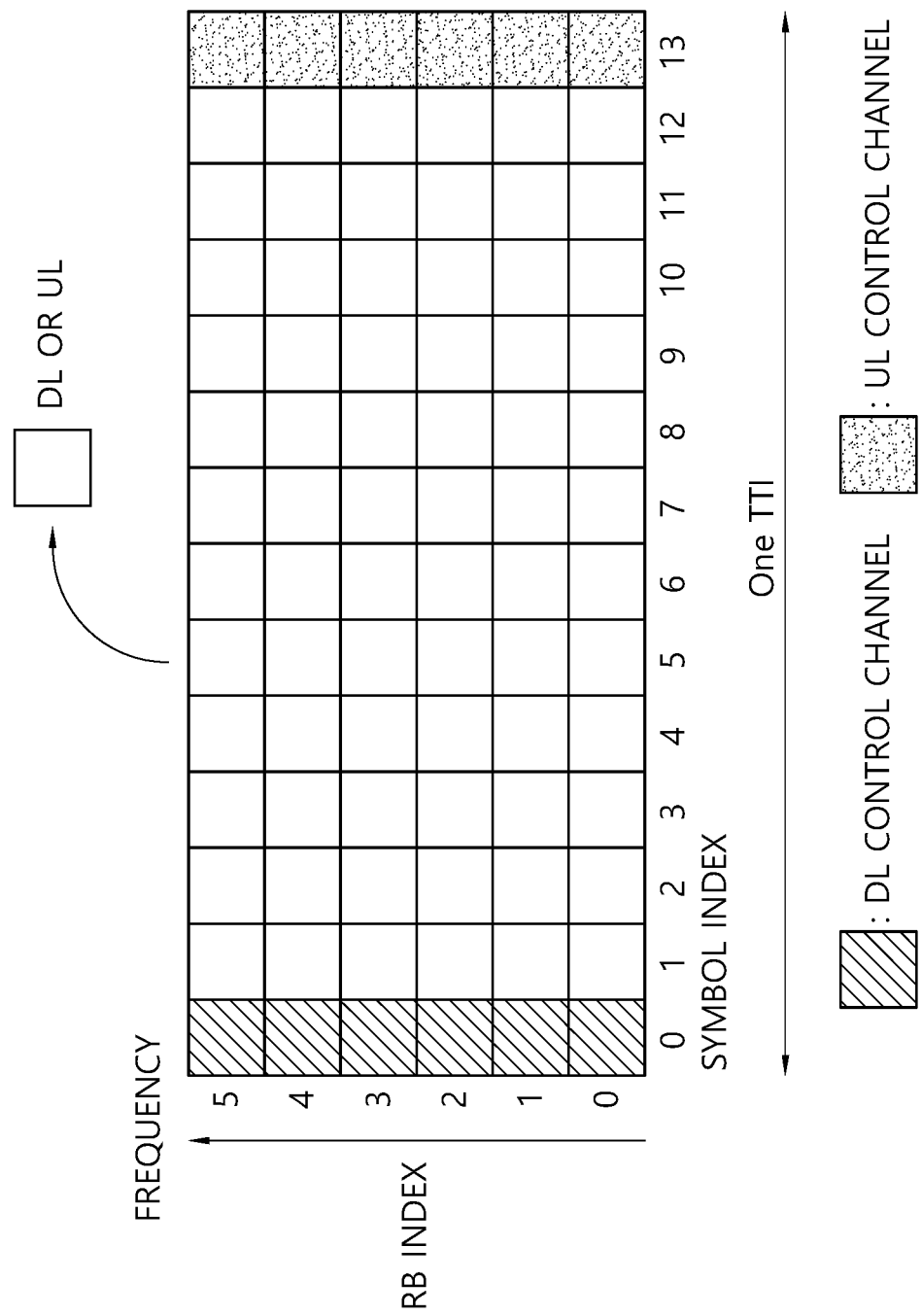
FIG. 5 shows an example of subframe types in NR.

FIG. 5 shows an example of subframe types in NR.

The TTI (transmission time interval) shown in FIG. 5 may be referred to as a subframe or a slot for NR (or new RAT). The subframe (or slot) of FIG. 5 may be used in a TDD system of NR (or new RAT) to minimize data transmission delay. As shown in FIG. 5, a subframe (or slot) includes 14 symbols, like the current subframe. The front symbol of the subframe (or slot) may be used for the DL control channel, and the rear symbol of the subframe (or slot) may be used for the UL control channel. The remaining symbols may be used for DL data transmission or UL data transmission. According to this subframe (or slot) structure, downlink transmission and uplink transmission may be sequentially performed in one subframe (or slot). Accordingly, downlink data may be received within a subframe (or slot), and uplink acknowledgment (ACK/NACK) may be transmitted within the subframe (or slot).

The structure of such a subframe (or slot) may be referred to as a self-contained subframe (or slot).

Specifically, the first N symbols in a slot may be used to transmit DL control channel (hereinafter, DL control region), and the last M symbols in a slot may be used to transmit UL control channel (hereinafter, UL control region). N and M are each an integer greater than or equal to 0. A resource region (hereinafter, referred to as a data region) between the DL control region and the UL control region may be used for DL data transmission or UL data transmission. For example, the PDCCH may be transmitted in the DL control region and the PDSCH may be transmitted in the DL data region. The PUCCH may be transmitted in the UL control region, and the PUSCH may be transmitted in the UL data region.

When the structure of such subframe (or slot) is used, the time it takes to retransmit data in which a reception error occurs is reduced, so that the final data transmission latency can be minimized. In such a self-contained subframe (or slot) structure, a time gap, from the transmission mode to the reception mode or from the reception mode to the transmission mode, may be required in a transition process. To this, some OFDM symbols when switching from DL to UL in the subframe structure may be set as a guard period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by p, a subcarrier spacing and a corresponding CP length may be expressed as shown in the following table.

TABLE 5

| M | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by μ, the number of OLDM symbols per slot Nslotsymb, the number of slots per frame Nframe,μslot, and the number of slots per subframe Nsubframe,μslot are expressed as shown in the following table.

TABLE 6

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by μ, the number of OLDM symbols per slot Nslotsymb, the number of slots per frame Nframe,μslot, and the number of slots per subframe Nsubframe,μslot are expressed as shown in the following table.

TABLE 7

| M | $N^{slot}_{symb}$ | $N^{frame,\mu}_{slot}$ | $N^{subframe,\mu}_{slot}$ |
|---|---|---|---|
| 2 | 12 | 40 | 4 |

<Bandwidth Part: BWP>

In NR, broadband frequencies up to 400 MHz can be used. In order to allow various UEs to efficiently allocate and use frequency resources, NR introduces a new concept called BWP.

When the UEs perform initial access and transmit information about the capability of the UE to the base station, the base station sets the BWP to be used by the UE for each UE based on this information, and may transmit information on the BWP set to each UE. Then, downlink and uplink data transmission/reception between each UE and the base station is performed only through the BWP configured for each UE. That is, when the base station sets the BWP to the UE, the UE instructs not to use a frequency band other than the BWP when performing wireless communication with the base station thereafter.

The base station may set the entire band of the carrier frequency up to 400 MHz as the BWP for the UE, and may set only some bands as the BWP for the UE. In addition, the base station may configure multiple BWPs for one UE. When multiple BWPs are configured for one UE, the frequency bands of each BWP may or may not overlap each other.

<V2X (Vehicle-to-Everything)>

V2X (vehicle-to-everything) refers to communication technology through all interfaces with the vehicle. The implementation form of V2X may be as follows.

In V2X, 'X' may mean a person (Persian) or a pedestrian (PEDESTRIAN). In this case, V2X may be displayed as V2P (vehicle-to-person or vehicle-to-pedestrian). Here, the pedestrian is not necessarily limited to a person moving on foot, and may include a person riding a bicycle, a driver or a passenger of a vehicle (below a certain speed).

Alternatively, 'X' may be an infrastructure/network. In this case, V2X may be expressed as V2I (vehicle-to-infrastructure) or V2N (vehicle-to-network), and may mean communication between a vehicle and a roadside unit (ROADSIDE UNIT: RSU) or a vehicle and a network. The roadside device may be a device that informs traffic-related infrastructure, for example, a speed. The roadside device may be implemented in a base station or a fixed terminal.

Alternatively, 'X' in V2X may be a vehicle (VEHICLE). In this case, V2X may be expressed as V2V (vehicle-to-vehicle), and may mean communication between vehicles.

A wireless device mounted on a vehicle may be referred to as a V2V device or a V2X device.

Communication between V2X devices without going through a base station is called V2X communication, and a link used for communication between V2X devices is also called sidelink.

There are the followings as physical signals used in sidelink.
  PSSCH (Physical Sidelink Shared Channel)
  PSCCH (Physical Sidelink Control Channel)
  PSDCH (Physical Sidelink Discovery Channel)
  PSBCH (Physical Sidelink Broadcast Channel)

In addition, there are the following physical signals used in sidelink.
  Demodulation Reference signal (DMRS)
  Sidelink Synchronization signal (SLSS)

The SLSS includes a primary sidelink synchronization signal (PSLSS) and a secondary sidelink synchronization signal (Secondary SLSS: SSLSS).

Figure 6:
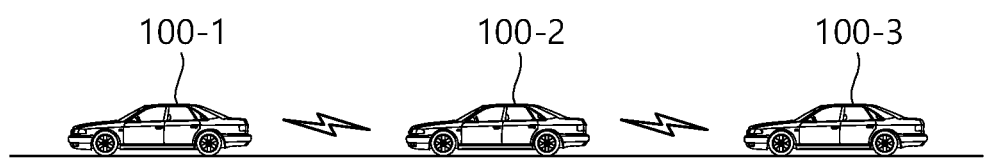
FIG. 6 is an exemplary diagram illustrating the concept of V2X.

FIG. 6 is an exemplary diagram illustrating the concept of V2X.

As can be seen with reference to FIG. 6, the wireless devices (ie, V2X devices) (100-1, 100-2, 100-3) mounted on the vehicle may communicate with each other.

Problems to be Solved by the Disclosure of this Specification

In 5G NR, four bandwidth parts (BWPs) can be configured for uplink or downlink in the terminal, and one BWP can be activated to perform communication.

On the other hand, a sidelink (sidelink) for V2X communication may be set to operate on a BWP (bandwidth part) different from the BWP for uplink. In this case, in order for the terminal (ie, the wireless communication device) to use the sidelink, it must change from the first BWP for the uplink to the second BWP for the sidelink, which result in a time delay.

DISCLOSURES OF THE PRESENT SPECIFICATION

Accordingly, the disclosure of the present specification suggests methods for reducing the BWP switching delay time.

I. 1st Disclosure

The first disclosure is a proposal for NR V2X sidelink (SL) BWP (Bandwidth Part) delay.

It is necessary to consider the time delay involved in BWP switching for NR V2X.

Figure 7:
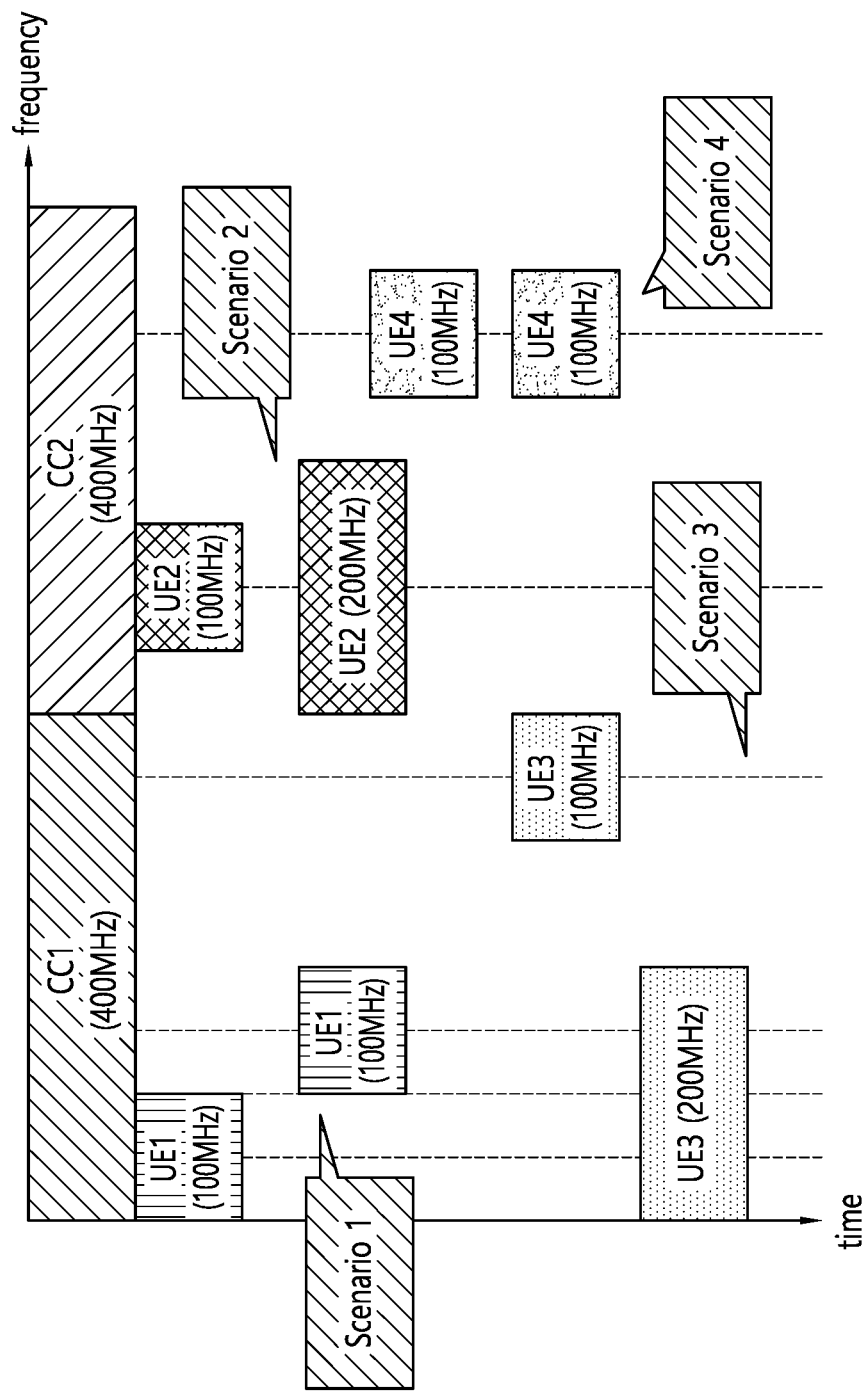
FIG. 7 is an exemplary diagram illustrating examples of BWP switching.

FIG. 7 is an exemplary diagram illustrating examples of BWP switching.

Referring to FIG. 7, scenario 1 is an example in which the bandwidth of the BWP is not changed, only the center frequency is changed.

Scenario 2 is an example in which only the size of the bandwidth is changed without changing the center frequency of the BWP. In this case, the subcarrier spacing (SCS) may or may not be changed.

Scenario 3 is an example in which both bandwidth and center frequency of BWP are changed. In this case, the size (SCS) of the subcarrier may or may not be changed.

Scenario 4 is an example in which the size of the center frequency and bandwidth of the BWP is not changed, but only the size (SCS) of the subcarrier is changed.

BWP switching may be initiated by downlink control information (DCI) or an RRC signal. Alternatively, BWP switching may be started based on a timer.

When the BWP is changed based on the DCI and the timer, a time delay $T_{BWPswitchDelay}$ may occur. The table below shows the time delay.

TABLE 8

| | NR slot | Delay time $T_{BWPswitchDelay}$ (slots) | |
|---|---|---|---|
| u | length (ms) | Type 1 (note 1) | Type 2 (note 1) |
| 0 | 1 | 1 | 3 |
| 1 | 0.5 | 2 | 5 |
| 2 | 0.25 | 3 | 9 |
| 3 | 0.125 | 6 | 18 |

Note
1: it may be changeable depending on device capabilities
Note
2: When the switching of the BWP includes the change of the SCS, the time delay is determined based on the larger SCS among the SCS before the switching of the BWP and the SCS after the switching.

A Type 1 UE corresponds to a UE capable of switching quickly, and a Type 2 UE corresponds to a UE performing a slightly slow switching. When BWP switching is performed based on DCI, during the delay time $T_{BWPswitchDelay}$, the UE may not expect to transmits uplink signals or to receive downlink signal.

When BWP switching is performed based on the timer, after the timer bwp-InactivityTimer expires, the UE may not expect to transmits uplink signals or to receive downlink signal.

When BWP switching is performed based on RRC, the delay time $T_{BWPswitchDelay}$ may be determined as follows.

$$T_{BWPswitchDelay} = \frac{T_{RRCprocessingDelay} + T_{BWPswitchDelayRRC}}{NR\ Slot\ length} \quad \text{[Equation 1]}$$

$T_{RRCprocessingDelay}$ is the delay time of the RRC procedure, and the unit is ms (milliseconds).

$T_{BWPswitchDelayRRC}$ is time required to switch BWP and $T_{BWPswitchDelayRRC}$ may be [6] ms.

When switching of BWP based RRC is performed, the UE may not expect to transmit uplink signals or to receive downlink signal during the time defined by $T_{RRCprocessingDelay} + T_{BWPswitchDelayRRC}$.

Hereinafter, the time delay due to BWP switching will be reviewed for the following environment.
  NR V2X in ITS (intelligent transport systems) band
  NR V2X in licensed band I-1. NR V2X in the ITS Band In the ITS band, NR V2X needs to consider the following two cases.

Case 1. ITS (NR V2X) (if the UE supports the ITS band for V2X)

Case 2. ITS (NR V2X)+NR Uu (if the UE supports the ITS band for V2X and supports the NR Uu link in the licensed band for V2X)

Here, the Uu link means a link between the base station and the UE.

For a UE supporting both NR V2X in the ITS band and NR Uu in the licensed band, NR sidelink (SL) BWP switching may be applied. However, since the channel bandwidth of the ITS band is not as wide as the NR licensed band, it must be determined whether NR sidelink (SL) BWP switching can be applied to NR V2X in the ITS band.

When NR sidelink (SL) BWP switching can be applied in ITS band, NR sidelink (SL) BWP switching needs to be improved for ITS band.

Figure 8:
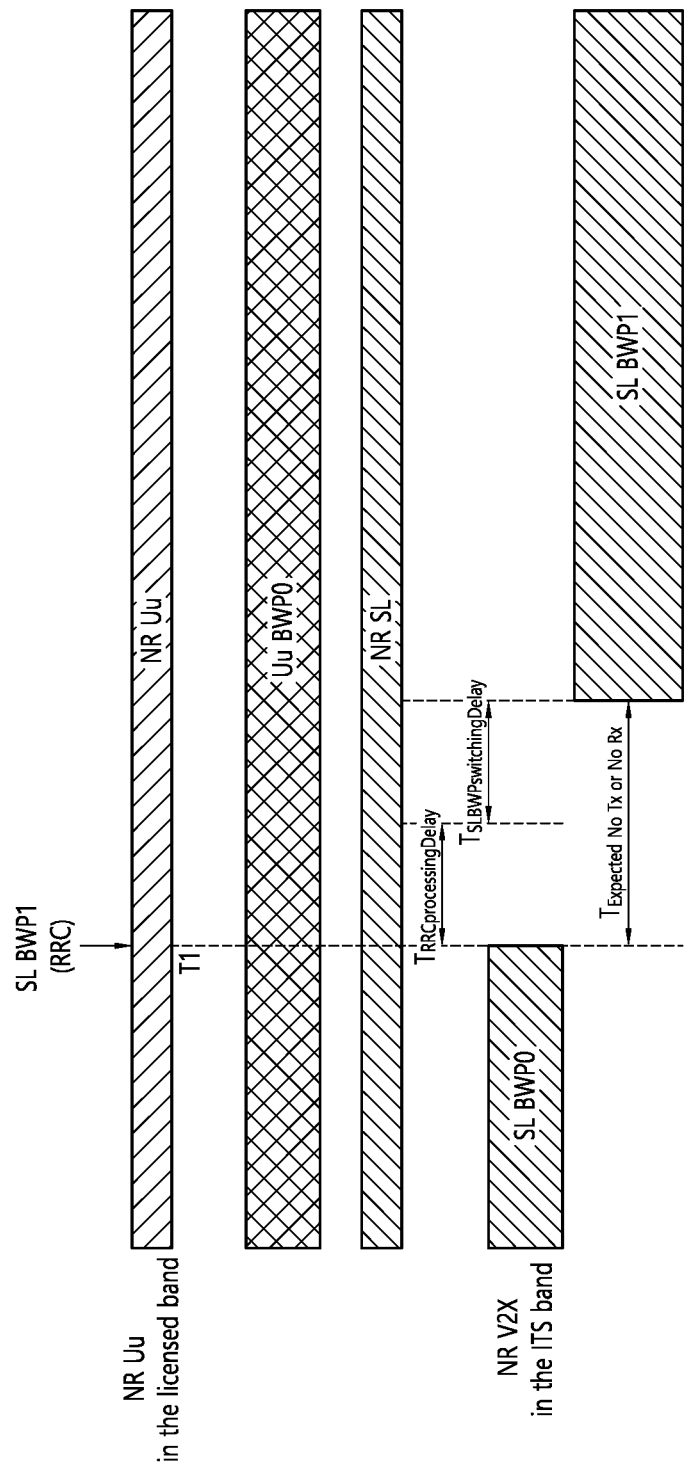
FIG. 8 shows an example of performing RRC-based NR sidelink (SL) BWP switching for NR V2X in an ITS band.

FIG. 8 shows an example of performing RRC-based NR sidelink (SL) BWP switching for NR V2X in an ITS band.

The RRC-based NR sidelink (SL) BWP is reset through the NR downlink. This requires an RRC processing time delay (e.g. $T_{RRCprocessingDelay}$).

After the RRC processing time delay (e.g., $T_{RRCprocessingDelay}$) from shown T1, NR sidelink (SL) BWP switching may be performed. This requires an NR sidelink (SL) BWP switching time delay (e.g. $T_{SLBWPswitchingDelay}$).

During the $T_{RRCprocessingDelay}+T_{SLBWPswitchingDelay}$ time from T1, the UE may not expect to transmit sidelink signals or to receive sidelink signal.

Regarding reconfiguration for a single NR sidelink (SL) component carrier (CC), the NR sidelink (SL) BWP switching time delay (eg $T_{SLBWPswitchingDelay}$) may be considered 3 ms. Considering a plurality of CCs, the RRC-based BWP switching time delay may be defined as [6] ms.

Based on the above, we propose the following.

Proposal 1: For an NR V2X UE supporting both NR V2X in the ITS band and NR Uu in the NR licensed band, research on whether NR sidelink BWP is needed or not in the ITS band is required.

Proposal 1-1: When the NR sidelink (SL) BWP is applied in the ITS band, the RRC-based NR sidelink (SL) BWP switching time delay may be defined as 3 ms.

Proposal 1-2: When NR sidelink (SL) BWP is applied in the ITS band, the UE may not expect to transmits NR sidelink signals or to receive NR sidelink signal during time (RRC processing time delay (eg $T_{RRCprocessingDelay}$)+NR sidelink (SL) BWP switching time delay (eg $T_{SLBWPswitchingDelay}$)).

I-2. NR V2X in Licensed Bands

For NR V2X in the licensed band, the NR sidelink (SL) and the NR Uu may be implemented in a TDM (time division multiplexing) scheme on the same carrier.

RRC-based NR sidelink (SL) BWP switching time delay and NR scheduling can be divided into the following three cases.

Case 1: When changing from NR Uu to NR sidelink (SL), RRC-based NR sidelink (SL) BWP switching may be reset during NR Uu.

Case 2: RRC based NR sidelink (SL) BWP switching may be reset during NR sidelink (SL).

Case 3: When changing from NR Uu to NR sidelink (SL) or vice versa, the NR sidelink (SL) BWP may be different from the NR uplink (UL) BWP.

I-2-1. Case 1: In Case RRC-Based NR Sidelink (SL) BWP Switching is Reset During NR Uu when Changing from NR Uu to NR Sidelink (SL)

Figure 9A:
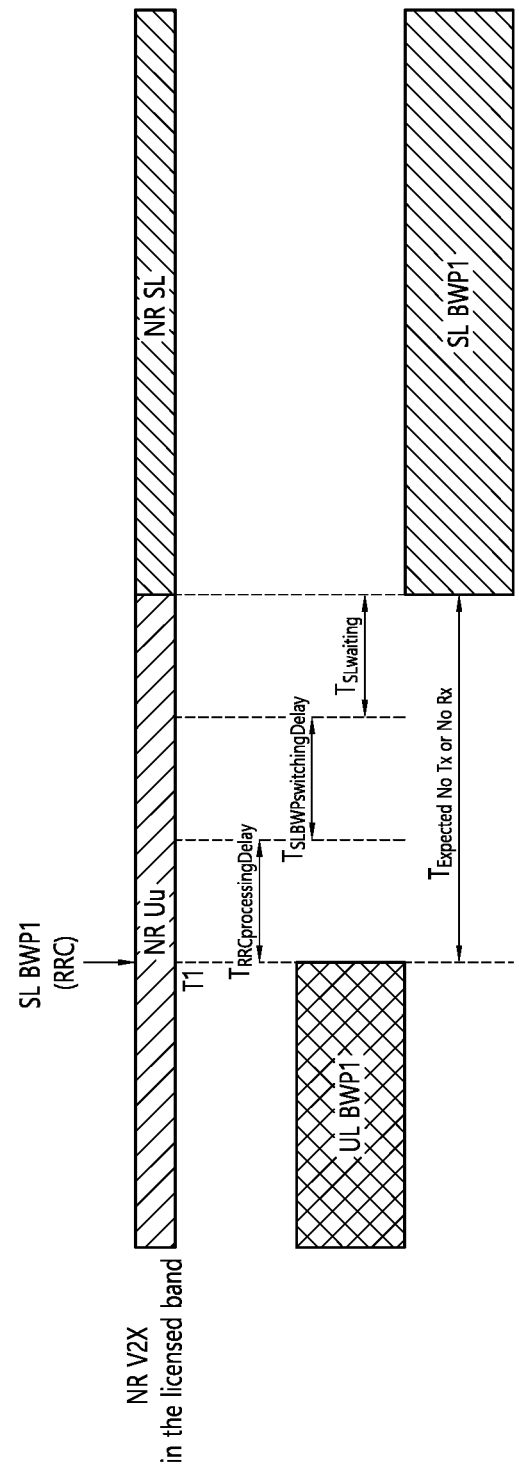
FIG. 9a to FIG. 9c show examples of NR sidelink (SL) BWP resetting.
Figure 9B:
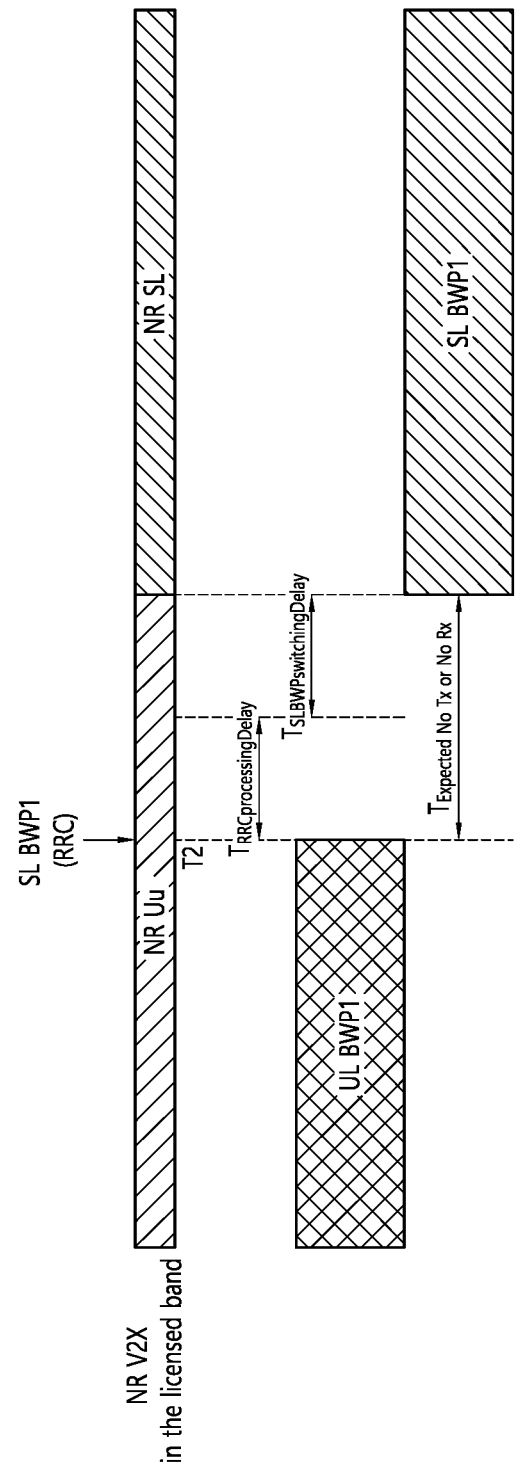
Figure 9C:
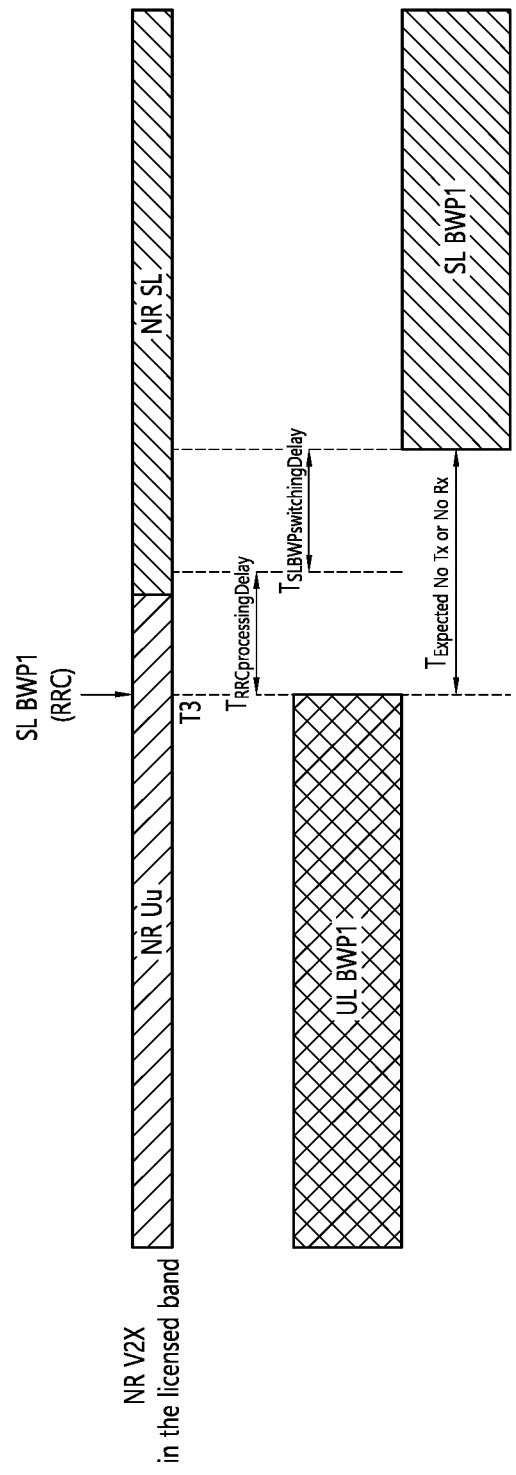

FIG. 9a to FIG. 9c show examples of NR sidelink (SL) BWP resetting.

Referring to FIG. 9a to 9c, when RRC-based NR sidelink (SL) BWP switching is reset in T1, T2 and T3, the UE may not expect transmission/reception.

In FIG. 9a to FIG. 9c, the uplink (UL) BWP and the sidelink (SL) BWP have different center frequencies, but even when the center frequency is the same and only the bandwidth size is different, the description may be applied.

Referring to FIG. 9a, when RRC-based NR sidelink (SL) BWP switching is reset too quickly, the UE cannot transmit and receive during the time longer than {RRC processing time delay (eg $T_{RRCprocessingDelay}$)+NR sidelink (SL) BWP switching time delay (eg $T_{SLBWPswitchingDelay}$)}.

Referring to FIG. 9b, during {RRC processing time delay (eg $T_{RRCprocessingDelay}$)+NR sidelink (SL) BWP switching time delay (eg $T_{SLBWPswitchigDelay}$)}), the UE cannot transmit/receive. The RRC processing time delay (e.g., $T_{RRCprocessingDelay}$) may be relatively long compared to the NR sidelink (SL) BWP switching time delay (e.g., $T_{SLBWPswitchingDelay}$). Considering that NR sidelink (SL) BWP switching can be performed only through RRC reconfiguration, the effect of RRC processing time delay (eg $T_{RRCprocessingDelay}$) cannot be ignored.

Therefore, in order to reduce transmission/reception loss due to RRC-based NR sidelink (SL) BWP switching, a solution is needed. As one solution, a start time (i.e., $T_{BWPstartDelay}$) of NR sidelink (SL) BWP switching may be set from a time when reception of RRC reconfiguration from the network ends.

This will be described with reference to FIGS. 10a to 10c.

Figure 10A:
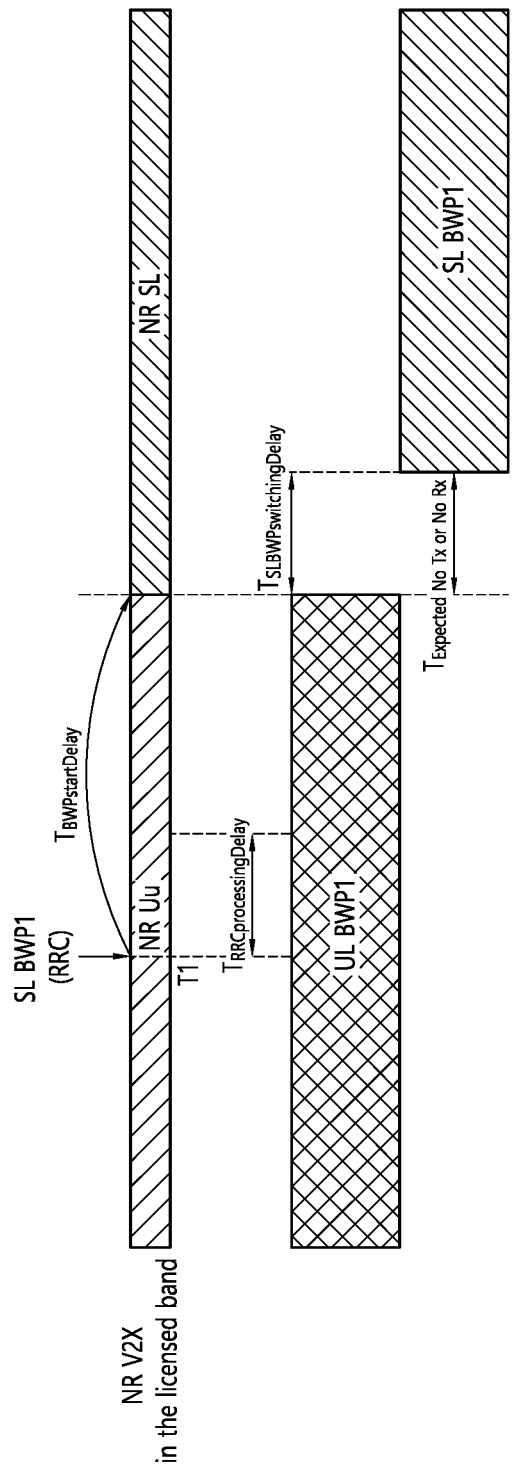
FIG. 10a to FIG. 10c are exemplary views illustrating a start time of NR sidelink (SL) BWP switching.
Figure 10B:
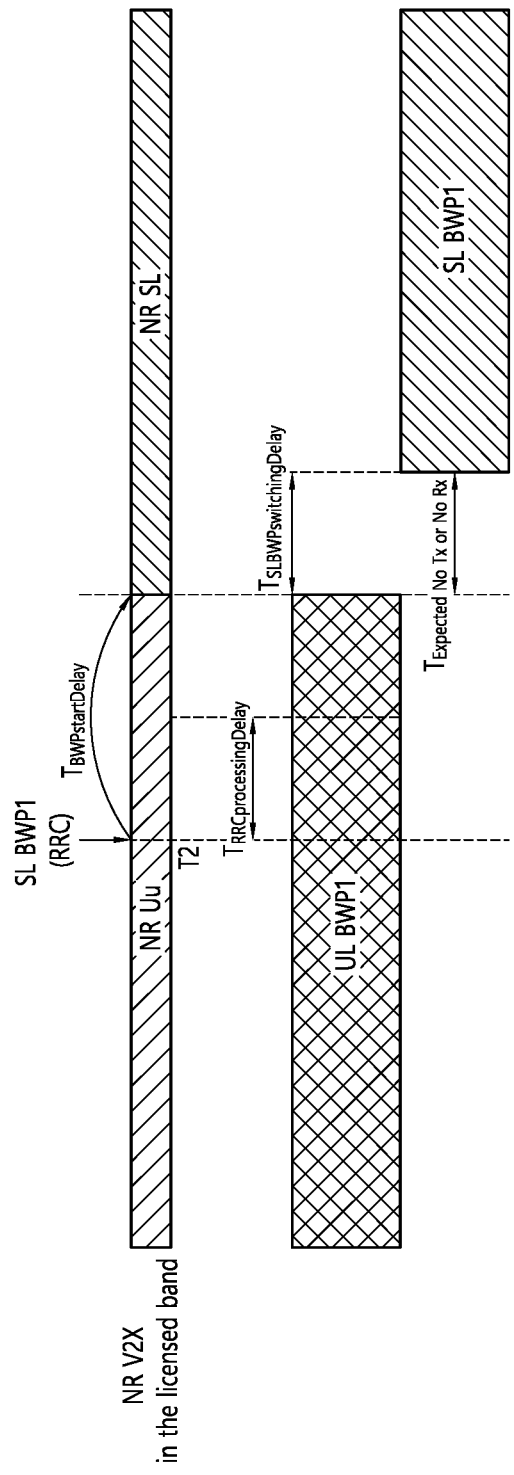
Figure 10C:
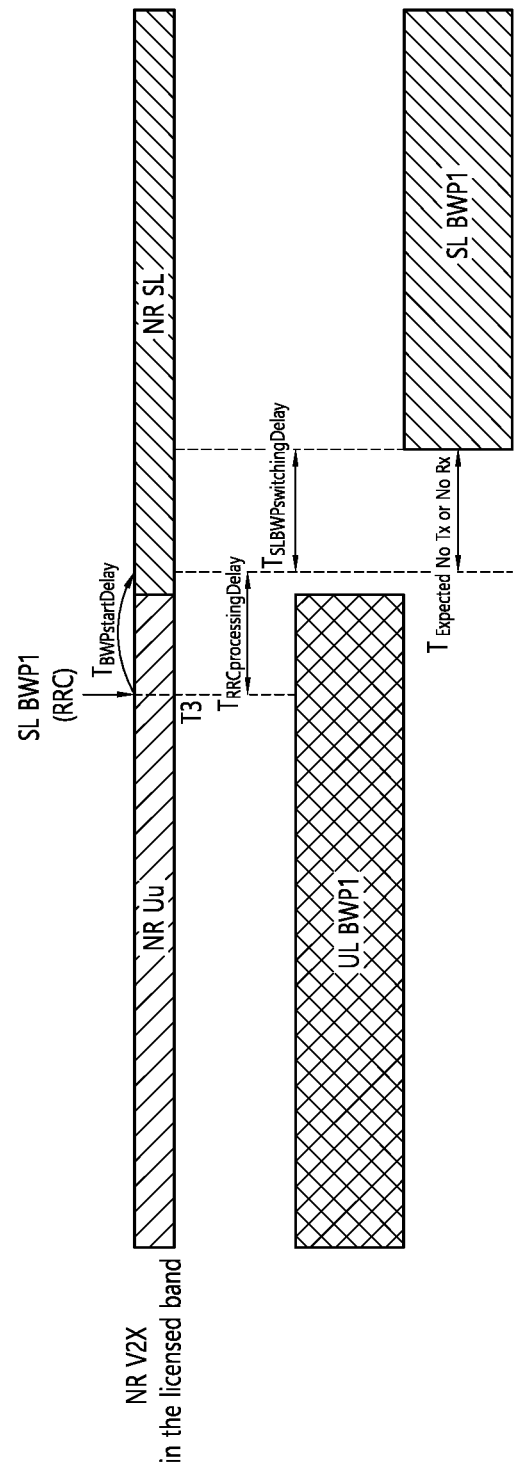

FIG. 10a to FIG. 10c are exemplary views illustrating a start time of NR sidelink (SL) BWP switching.

Referring to FIG. 10a to FIG. 10c, the NR sidelink (SL) BWP switching time delay (e.g., $T_{SLBWPswitchingDelay}$), that is, the time during which transmission/reception is stopped may be shortened.

The UE may transmit the NR uplink (UL) signal and receive the NR downlink (DL) signal only during the NR Uu time.

I-2-2: Case 2: In Case RRC Based NR Sidelink (SL) BWP Switching is Reset During NR Sidelink (SL)

Figure 11A:
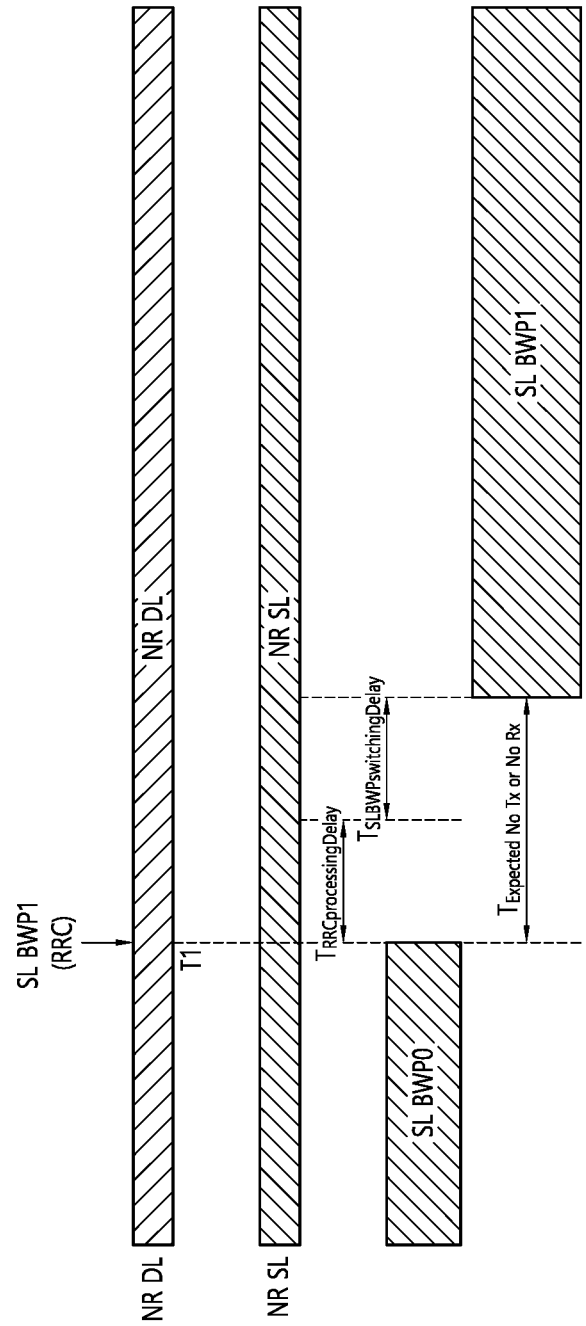
FIG. 11a to FIG. 11b show examples in which NR sidelink (SL) BWP switching is performed in an NR sidelink (SL) time interval.
Figure 11B:
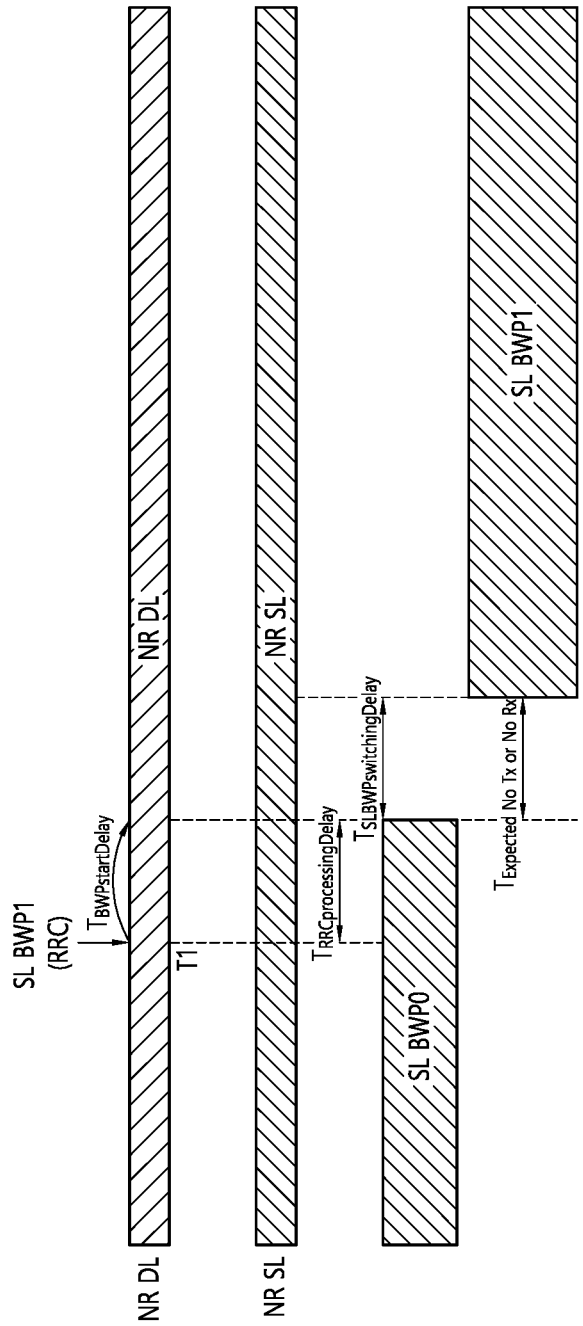

FIG. 11a to FIG. 11b show examples in which NR sidelink (SL) BWP switching is performed in an NR sidelink (SL) time interval.

In FIG. 11a to FIG. 11b, when RRC-based NR sidelink (SL) BWP switching is reset at time T1, an expected interval in which transmission and reception of the UE is stopped is shown.

If $T_{BWPstartDelay}$ is not applied, the UE expects that transmission and reception will be stopped during {RRC processing time delay (eg $T_{RRCprocessingDelay}$)+NR sidelink (SL) BWP switching time delay (e.g. $T_{SLBWPswitchingDelay}$)} time.

This causes a large loss in sidelink (SL) scheduling.

If $T_{BWPstartDelay}$ is applied, the UE expects that transmission and reception will be stopped only during {NR sidelink (SL) BWP switching time delay (e.g., $T_{SLBWPswitcingDelay}$)} time. That is, the time during which transmission/reception is stopped may be shortened.

Therefore, for a UE supporting both NR V2X in the ITS band and NR Uu in the NR licensed band, $T_{BWPstartDelay}$ may be applied.

I-2-3. Case 3: In Case NR Sidelink (SL) BWP is Different from NR Uplink (UL) BWP when Changing from NR Uu to NR Sidelink (SL) or Vice Versa I-2-3-1. In Case the Center Frequency is Different or the SCS is Different When the BWP for the NR sidelink (SL) and the BWP for the NR uplink (UL) are different from each other, when switching from NR Uu to NR sidelink (SL) at time T1 or vice versa at time T2, The UE may expect that transmission and reception will be stopped during the time which the switching is performed.

Figure 12:
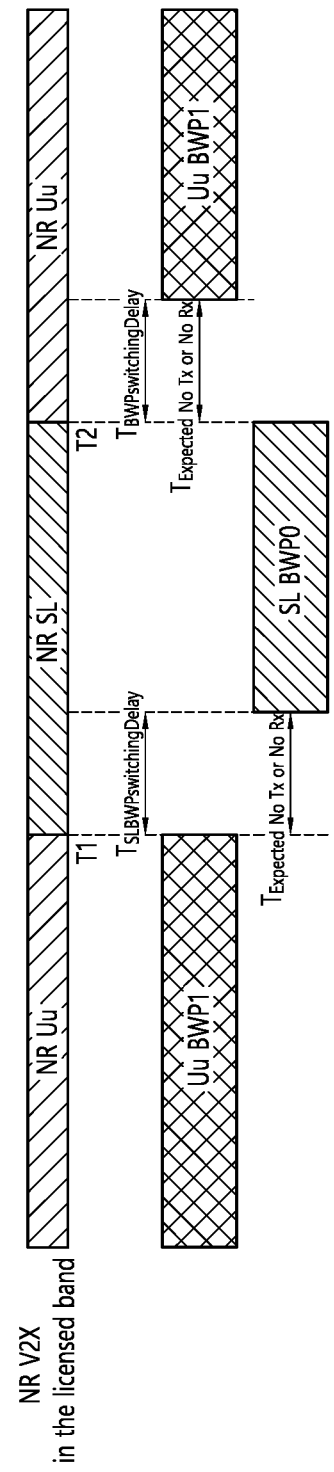
FIG. 12 shows an example of a case of switching from BWP for NR Uu to BWP for NR sidelink (SL) or vice versa.

FIG. 12 shows an example of a case of switching from BWP for NR Uu to BWP for NR sidelink (SL) or vice versa.

When the BWP for the NR sidelink (SL) and the BWP for the NR Uu are different from each other, when changing from the NR Uu to the NR sidelink (SL), the UE may expect that transmission and reception will be stopped during NR sidelink (SL) BWP switching time delay (eg $T_{SLBWPswitchingDelay}$).

In a situation where the BWP for the NR sidelink (SL) and the BWP for the NR Uu are different, when changing from the NR sidelink (SL) to the NR Uu, the UE may expect that transmission and reception will be stopped during the BWP switching time delay (e.g., $T_{BWPswitchingDelay}$) time.

Figure 13:
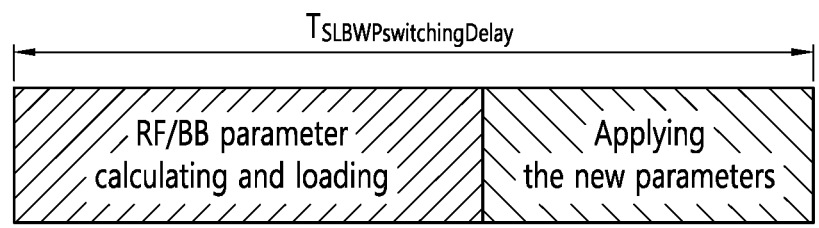
FIG. 13 is an exemplary diagram illustrating a switching delay time between BWP for NR sidelink (SL) and BWP for NR Uu for Case 3 of clause I-2-3.

FIG. 13 is an exemplary diagram illustrating a switching delay time between BWP for NR sidelink (SL) and BWP for NR Uu for Case 3 of clause I-2-3.

The NR sidelink (SL) BWP switching time delay (e.g., $T_{SLBWPswitchingDelay}$) and the BWP switching time delay (e.g., $T_{BWPswitchingDelay}$) may be defined in consideration of an RF/BB (baseband) parameter and a load.

The time taken to apply the new parameter may be 600 us for the type 1 terminal and 2 ms for the type 2 terminal.

The below table shows the BWP switching delay times of the type 1 UE and the type 2 U.

When the BWP for the NR sidelink (SL) and the BWP for the NR Uu are the same, when switching from the BWP for the NR Uu to the BWP for the NR sidelink (SL) or vice versa, the delay may not occurs.

The below table shows the delays for the Type 1 UE and the Type 2 UE in case 3.

TABLE 9

| | RF/BB delay (unit: us) | | BWP sidelink(SL) switching delay (unit: slot) | |
|---|---|---|---|---|
| SCS | Type1 | Type2 | Type1 | Type2 |
| 15 kHz | 600 | 2000 | 1 | 2 |
| 30 kHz | 600 | 2000 | 2 | 4 |
| 60 kHz | 600 | 2000 | 3 | 8 |
| 120 kHz | 600 | 2000 | 5 | 16 |

Based on the above, the first disclosure proposes as follows.

Proposal 2: NR sidelink (SL) BWP switching time delay for NR V2X terminal in a licensed band should be determined in consideration of the following.

Reduction of time during stop of transmission and reception due to RRC-based NR sidelink (SL) BWP switching When BWP for NR sidelink (SL) and BWP for NR uplink (UL) are different, change from NR Uu to NR sidelink (SL) or vice versa Proposal 3: When BWP for NR sidelink (SL) and BWP for NR uplink (UL) are the same, when changing from NR Uu to NR sidelink (SL) or vice versa, for NR V2X UE in the licensed band, the BWP switching delay time may not be defined.

Proposal 4: In order to reduce transmission/reception loss caused by RRC-based NR sidelink (SL) BWP switching, information (i.e., $T_{BWPstartDelay}$) on the start time of NR sidelink (SL) BWP switching may be transmitted to the UE by the network, from the time when RRC reconfiguration is received from the network. For example, the network may transmit SL-bwp-SwitchStartTime information to the UE.

Proposal 5: In order to reduce transmission/reception loss caused by RRC-based NR Uu BWP switching, the network may transmit, to the UE, information on the timing of NR NR Uu BWP switching (i.e., TBWPstartDelay) from the time when RRC reset reception from the network is completed. For example, the network may transmit Uu (UL/DL)-bwp-SwitchStartTime information to the UE.

Proposal 6: With respect to $T_{RRCprocssesingDelay}$, a setting value (e.g., SL-bwp-SwitchStartTime or Uu (UL/DL)-bwp-SwitchStartTime) may be greater than or equal to $T_{RRCprocssesingDelay}$.

For example, when $T_{RRCprocssesingDelay}=10$ ms, information related to SL-bwp-SwitchStartTime and Uu (UL/DL)-bwp-SwitchStartTime may be transmitted from the network to the UE.

TABLE 10

| ServingCellConfig | |
|---|---|
| SL-bwp-SwitchStartTime | {ms 10, ms20, . . . spare1} |
| Uu-bwp-SwitchStartTime | {ms 10, ms20, . . . spare1} |

Here, $T_{RRCprocssesingDelay}$ is the time delay that occurs in processing the RRC procedure.

Figure 14:
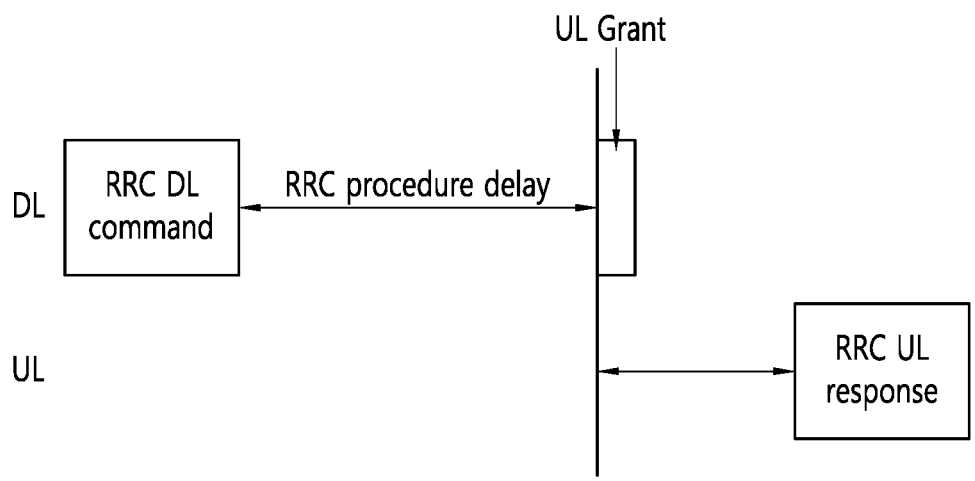
FIG. 14 is an exemplary diagram illustrating an example of an RRC processing delay time.

FIG. 14 is an exemplary diagram illustrating an example of an RRC processing delay time.

As can be seen with reference to FIG. 14, an RRC processing delay time occurs between time when the network transmits an RRC DL command and time when the network transmits a UL grant.

The below table shows the RRC processing delay time.

TABLE 11

| Name of procedure | network -> UE | UE -> network | Delay time value [ms] |
|---|---|---|---|
| RRC reconfiguration | RRCReconfiguration | RRCReconfigurationComplete | 10 |
| RRC reconfiguration (scell addition/release) | RRCReconfiguration | RRCReconfigurationComplete | 16 |
| RRC reconfiguration (SCG establishment/ modification/ release) | RRCReconfiguration | RRCReconfigurationComplete | 16 |

TABLE 11-continued

| Name of procedure | network -> UE | UE -> network | Delay time value [ms] |
|---|---|---|---|
| RRC setup | RRC Setup | RRCSetupComplete | 10 |
| RRC Release | RRCRelease | | NA |
| RRC re-establishment | RRCReestablishment | RRCReestablishmentComplete | 10 |
| RRC resume | RRCResume | RRCResumeComplete | 6 or 10 |
| RRC resume (scell addition/release) | RRCResume | RRCResumeComplete | 16 |
| Initial AS security activation | Security ModeCommand | SecurityModeComplete/ SecurityMode Failure | 5 |
| UEassistance information | | UEAssistanceInformation | NA |
| UEcapability transfer | UECapabilityEnquiry | UECapability Information | FFS |
| Counter check | CounterCheck | CounterCheckResponse | 5 |

II. 2nd Disclosure

The second disclosure is a proposal for interruption of transmission/reception that occurs during sidelink (SL) BWP switching in NR V2X.

BWP switching may be performed by DCI, a timer, and an RRC signal, and transmission/reception may be interrupted due to a time delay during BWP switching.

In NR V2X, when SL BWP switching is performed by an RRC signal, transmission/reception interruption may occur according to the below cases.

For NR V2X in ITS band
For NR V2X in licensed bands

II-1. For NR V2X in ITS Band

There may be two scenarios for NR V2X operation in the ITS band.

ITS (NR V2X) (if the UE supports the ITS band for V2X)
ITS (NR V2X)+NR Uu (when the UE supports the ITS band and supports NR Uu in the licensed band for V2X In the case of a UE supporting only NR V2X in the ITS band, since there is no serving cell communicating with the UE for V2X, interruption of transmission and reception with the serving cell does not occur during SL BWP switching.

In the case of a UE supporting NR V2X in the ITS band and NR Uu in the licensed band, since sidelink (SL) BWP switching may not be defined for the ITS band, interruption of transmission and reception with the serving cell may not occur due to sidelink (SL) BWP switching performed by the UE.

When sidelink (SL) BWP switching for NR V2X in the ITS band is performed based on the RRC signal, transmission and reception with the serving cell may be stopped in X slots due to the sidelink (SL) BWP switching.

During NR Uu BWP switching in the licensed band, transmission and reception may be stopped in X slots on the sidelink (SL) due to NR Uu BWP switching.

In the below table, the length of transmission/reception interruption may be expressed by X slots.

TABLE 12

| μ | NR slot length (ms) | Interruption length X (note 1) |
|---|---|---|
| 0 | 1 | 1 |
| 1 | 0.5 | 1 |
| 2 | 0.25 | 3 |
| 3 | 0.125 | 5 |

Note
1: When BWP switching includes a change in SCS, transmission/reception interruption caused by BWP switching is determined based on the larger SCS among SCS before switching of BWP and SCS after switching.

Figure 15A:
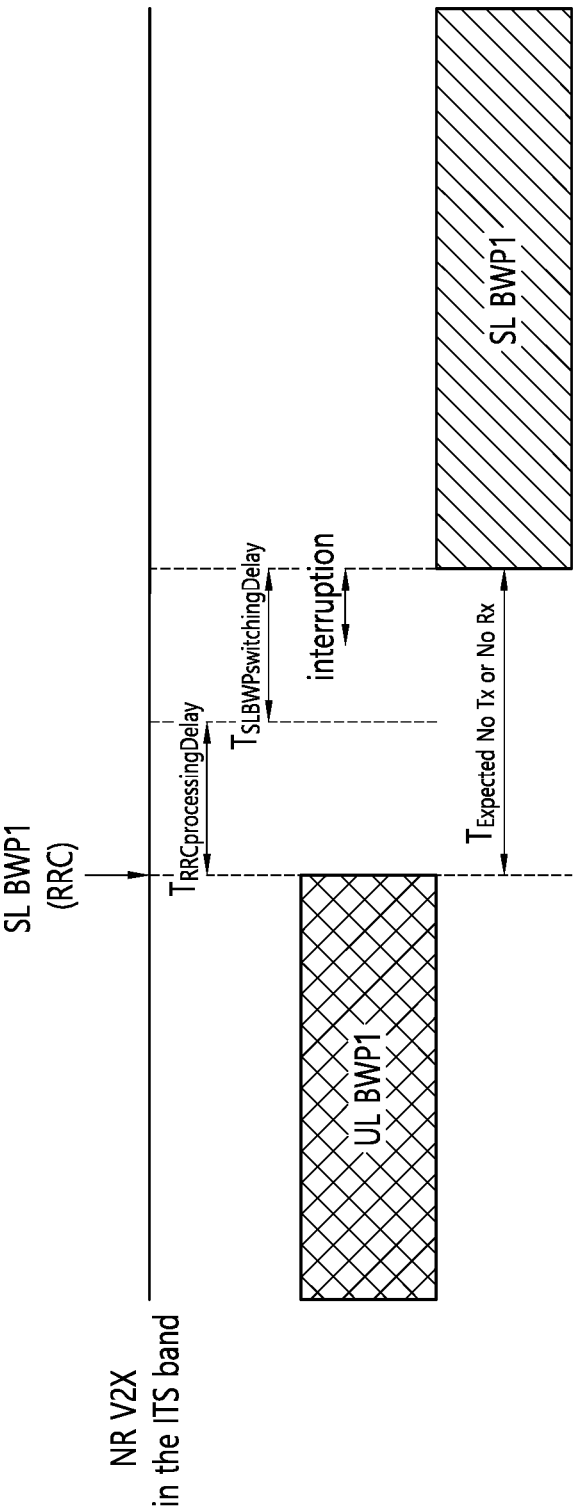
FIG. 15a and FIG. 15b are exemplary diagrams illustrating switching of an NR sidelink (SL) BWP.
Figure 15B:
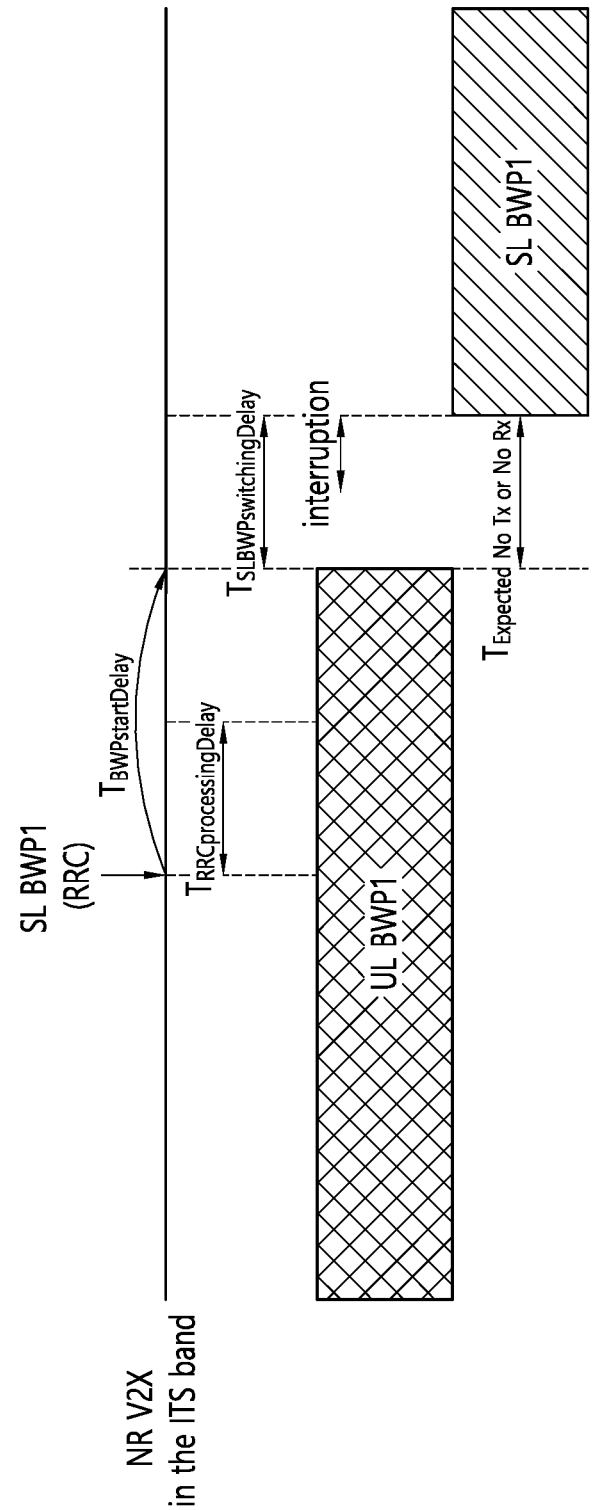

FIG. 15a and FIG. 15b are exemplary diagrams illustrating switching of an NR sidelink (SL) BWP.

FIG. 15a and FIG. 15b show a section in which transmission and reception is stopped when NR sidelink (SL) BWP switching is reset by an RRC signal.

In consideration of the starting point (e.g., TBWPstartDelay) of NR sidelink (SL) BWP switching from time when reception of the RRC signal from the network is terminated, the period in which transmission and reception is expected to be interrupted may be reduced.

FIG. 15a is an example in which $T_{BWPstartDelay}$ is not considered, and FIG. 15b is an example in which $T_{BWPstartDelay}$ is considered.

The time period in which transmission and reception is expected to be interrupted may be as follows.

When $T_{BWPstartDelay}$ is not considered in FIG. 15a, a time interval in which transmission/reception is expected to be interrupted={RRC processing time delay (eg $T_{RRCprocessingDelay}$)+NR sidelink (SL) BWP switching time delay (e.g. $T_{SLBWPswitchingDelay}$)}

When $T_{BWPstartDelay}$ is considered in FIG. 15b, a time interval in which transmission/reception is expected to be interrupted={NR sidelink (SL) BWP switching time delay (e.g., $T_{SLBWPswitchingDelay}$)}

Accordingly, transmission/reception interruption may occur in the below time interval.

When $T_{BWPstartDelay}$ is not considered, time interval in which transmission and reception is expected to be interrupted={RRC processing time delay (e.g. $T_{RRCprocessingDelay}$)+NR sidelink (SL) BWP switching time delay (e.g. $T_{SLBWPswitchingDelay}$)}

When $T_{BWPstartDelay}$ is considered, time interval in which transmission/reception is expected to be interrupted={NR sidelink (SL) BWP switching time delay (e.g. $T_{SLBWPswitchingDelay}$)}

Proposal 1: Considering NR V2X in the ITS band when not supporting NR Uu, the UE does not cause interruption of transmission and reception with the serving cell.

Proposal 2: Considering NR V2X in the ITS band when supporting NR Uu, transmission and reception with the serving cell may be stopped for up to X slots due to sidelink (SL) BWP switching.

Proposal 3: Considering NR V2X in the ITS band when supporting NR Uu, transmission and reception on the NR sidelink (SL) may be stopped for up to X slots due to NR Uu BWP switching.

Proposal 4: Considering NR V2X in the ITS band when supporting NR Uu, the length of transmission/reception interruption caused by the BWP switching time delay may be as shown in the above Table 12.

Proposal 5: In case of supporting NR Uu, considering NR V2X in the ITS band, it may be as follows.

When the network transmits, to the UE, information (e.g., SL-bwp-SwitchStartTime) on the start time (i.e., $T_{BWPstartDelay}$) of the NR sidelink (SL) BWP switching, in order to reduce transmission/reception loss caused by the RRC-based NR sidelink (SL) BWP switching, interruption of transmission/reception with the serving cell may be permitted only within $T_{SLBWPswitchDelayRRC}$ from the time when the reception of RRC signal from the network is finished.

When the network does not transmit, to the UE, information (e.g., SL-bwp-SwitchStartTime) about the starting point (i.e., $T_{BWPstartDelay}$) of NR sidelink (SL) BWP switching from the time when the reception of RRC signal from the network is finished, Interruption of transmission and reception with the serving cell may be allowed only in RRC processing time delay (e.g., $T_{RRCprocessingDelay}$)+$T_{SLBWPswitchDelayRRC}$.

When the network transmits, to the UE, information (e.g., bwp-SwitchStartTime) on the starting point (i.e., TBWPstartDelay) of NR Uu BWP switching from the time when reception of the RRC signal from the network is finished, interruption of transmission and reception on the sidelink may be permitted only within $T_{BWPswitchDelayRRC}$.

When the network does not transmit, to the UE, information (e.g., bwp-SwitchStartTime) on the start point (i.e., TBWPstartDelay) of the NR Uu BWP switching from the time when reception of the RRC signal from the network is finished, interruption of transmission and reception on the sidelink may be permitted only within RRC Processing time delay (e.g. $T_{RRCprocessingDelay}$)+$T_{BWPswitchDelayRRC}$.

When NR Uu BWP switching is performed based on DCI or based on timer, interruption of transmission/reception for the NR sidelink (SL) may be allowed only within $T_{BWPswitchDelay}$, which is a DCI-based or timer-based BWP switching time delay.

II-2. NR V2X in Licensed Bands

Considering the NR V2X in the licensed band, the NR sidelink (SL) and the NR Uu may be operated on the same carrier in the TDM scheme. Sidelink (SL) BWP switching may be performed by dividing the following two cases by the RRC signal.

Case 1: In case NR sidelink (SL) BWP switching is performed with RRC signal

Case 2: In case changing from NR Uu to NR sidelink (SL) or in the opposite direction, BWP for NR sidelink (SL) and BWP for NR uplink (UL) are different II-2-1. Case 1: In Case NR Sidelink (SL) BWP Switching is Performed by RRC Signal FIGS. 16a and 16b are exemplary diagrams illustrating an example of NR sidelink (SL) BWP switching.

Figure 16A:
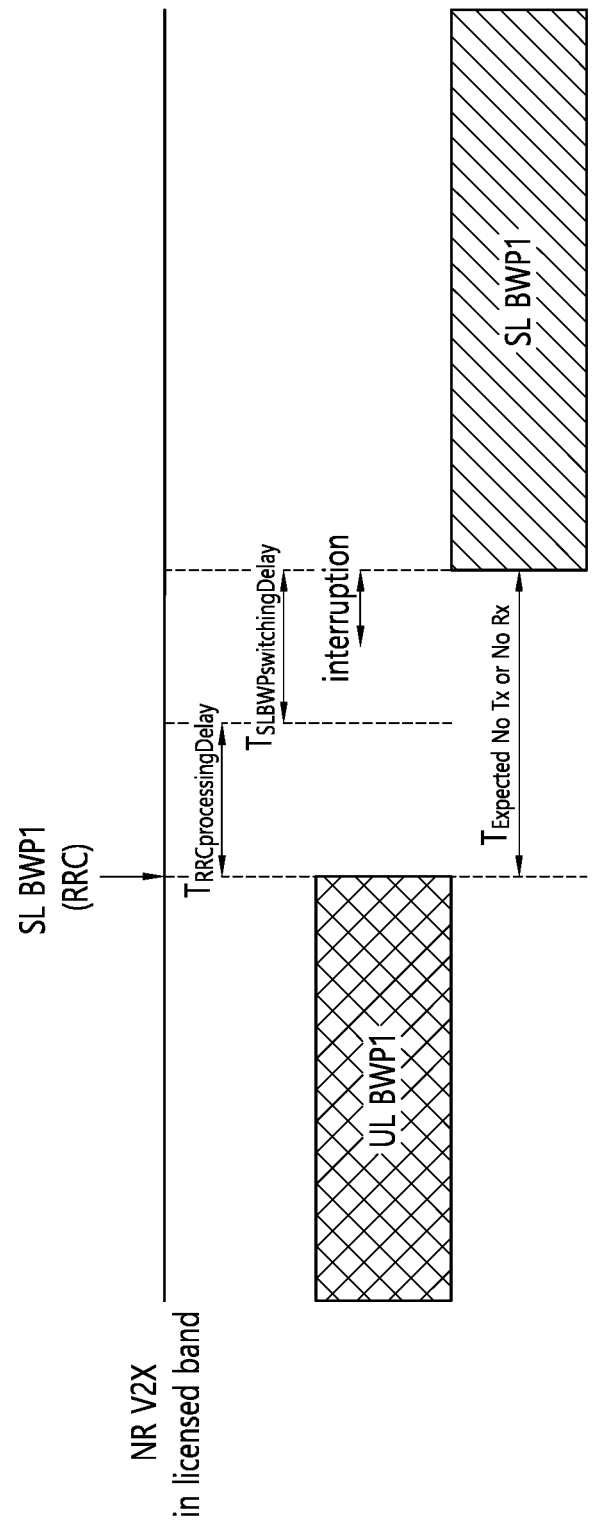
FIGS. 16a and 16b are exemplary diagrams illustrating an example of NR sidelink (SL) BWP switching.
Figure 16B:
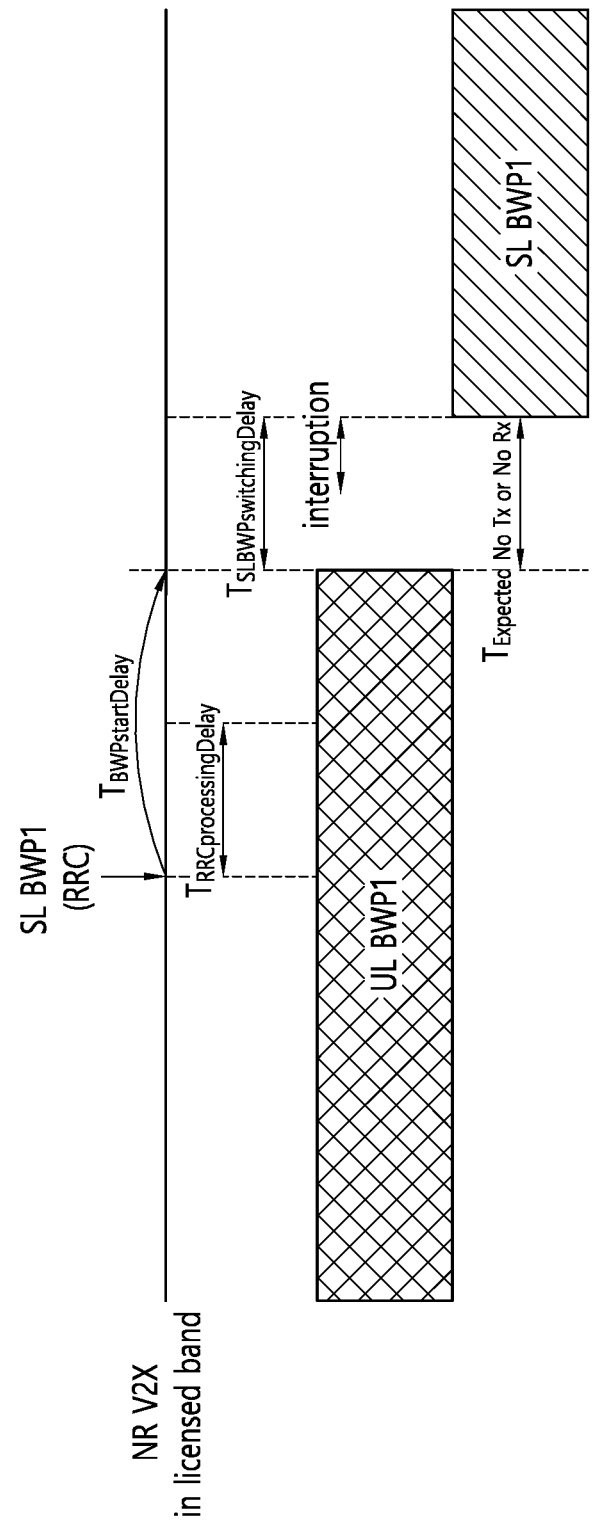

FIGS. 16a and 16b show an expected interruption time period for transmission and reception when NR sidelink (SL) BWP switching is performed based on RRC.

It is possible to reduce the time period during which transmission and reception is stopped in consideration of the time point ($T_{BWPstartDelay}$) of NR sidelink (SL) BWP switching from the time when the reception of RRC signal from the network is finished.

FIG. 16a is an example in which $T_{BWPstartDelay}$ is not considered, and FIG. 16B is an example in which $T_{BWPstartDelay}$ is considered.

The time period in which interruption of transmission and reception is expected may be as follows.

If $T_{BWPstartDelay}$ is not considered, the time period in which transmission and reception is expected to be interrupted={RRC processing time delay (e.g. $T_{RRCprocessingDelay}$)+NR sidelink (SL) BWP switching time delay (eg $T_{SLBWPswitchingDelay}$)}

When $T_{BWPstartDelay}$ is considered, time interval in which transmission and reception is expected to be interrupted=NR sidelink (SL) BWP switching time delay (e.g., $T_{SLBWPswitchingDelay}$)}

Accordingly, transmission/reception interruption may occur in the following time interval.

If $T_{BWPstartDelay}$ is not taken into consideration, the time period in which transmission and reception is expected to be interrupted={RRC processing time delay (e.g. $T_{RRCprocessingDelay}$)+NR sidelink (SL) BWP switching time delay (e.g. $T_{SLBWPswitchingDelay}$)}

When considering $T_{BWPstartDelay}$, time interval in which transmission and reception is expected to be interrupted={NR sidelink (SL) BWP switching time delay (e.g. $T_{SLBWPswitchingDelay}$)}.

In the below table, the length of transmission/reception interruption may be expressed by X slots.

TABLE 13

| μ | NR slot length (ms) | Interruption length X (Note 1) |
|---|---|---|
| 0 | 1 | 1 |
| 1 | 0.5 | 1 |
| 2 | 0.25 | 3 |
| 3 | 0.125 | 5 |

Note
1: When BWP switching includes a change in SCS, interruption of transmission/reception caused by BWP switching is determined based on the larger SCS among SCS before switching of BWP and SCS after switching.

II-2.2. Case 2: When Changing from NR Uu to NR Sidelink (SL) or in the Opposite Direction, BWP for NR Sidelink (SL) and BWP for NR Uplink (UL) are Different FIG. 17 shows an example of switching from NR Uu to NR sidelink (SL).

Figure 17:
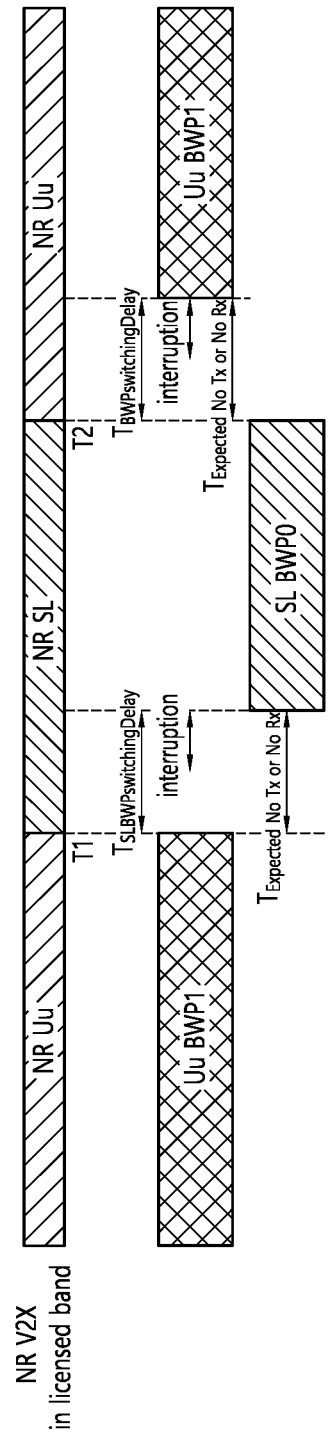
FIG. 17 shows an example of switching from NR Uu to NR sidelink (SL).

In FIG. 17, when the BWP for the NR sidelink (SL) and the BWP for the NR uplink (UL) are different from each other, when switching from NR Uu to NR sidelink (SL) or vice versa, a time interval when transmission/reception interruption is expected is shown.

When the BWP for the NR sidelink (SL) and the BWP for the NR uplink (UL) are different from each other, it may be organized as follows.

When switching from NR Uu to NR sidelink (SL), time interval in which transmission/reception is expected to be interrupted=NR sidelink (SL) BWP switching time delay (eg $T_{SLBWPswitchingDelay}$)

When switching from the NR sidelink (SL) to the NR Uu, a time interval in which transmission/reception is expected to be interrupted=BWP switching time delay (e.g., $T_{BWPswitchingDelay}$)

Interruption of transmission and reception may occur in the time interval which is described below.

When switching from NR Uu to NR sidelink (SL), transmit/receive interruption occurs within {NR sidelink (SL) BWP switching time delay (e.g. $T_{SLBWPswitchingDelay}$)}

When switching from NR sidelink (SL) to NR Uu, transmission/reception interruption occurs within {BWP switching time delay (e.g. $T_{BWPswitchingDelay}$)}

Hereinafter, it is proposed as follows.

Proposal 6: Considering the NR V2X terminal in the licensed band, due to sidelink (SL) BWP switching, interruption of transmission and reception with the serving cell occurs for X slots.

NR sidelink (SL) BWP switching may be performed based on an RRC signal.

In a situation in which the BWP for the NR sidelink (SL) is different from the BWP for the NR uplink (UL), the NR Uu may be switched to the NR sidelink (SL).

Proposal 7: Considering NR V2X in the licensed band, transmission and reception in the NR sidelink (SL) may be stopped for X slots due to NR Uu BWP switching.

Proposal 8: Considering NR V2X in a licensed band, the length of time during which transmission and reception is stopped due to BWP switching delay may be as shown in Table 13.

Proposition 9: Considering NR V2X in licensed bands,

When the network transmits, to the UE, information (e.g., SL-bwp-SwitchStartTime) on the start time ($T_{BWPstartDelay}$) of the NR sidelink (SL) BWP switching from the time when the reception of RRC signal from the network is finished, the RRC-based NR sidelink (SL) In order to reduce transmission/reception loss caused by BWP switching, interruption of transmission/reception with the serving cell may be permitted only within $T_{SLBWPswitchDelayRRC}$.

If the network does not transmit, to the UE, information (e.g., SL-bwp-SwitchStartTime) on the starting point (i.e., $T_{BWPstartDelay}$) of the NR sidelink (SL) BWP switching, or if there is no related configuration, interruption of transmission and reception with the serving cell may be allowed only within RRC processing time delay (e.g. $T_{RRCprocessingDelay}$)+$T_{SLBWPswitchDelayRRC}$.

When the network transmits, to the UE, information (e.g., bwp-SwitchStartTime) on the start time ($T_{BWPstartDelay}$) of NR Uu BWP switching from the time when the reception of RRC signal from the network is finished, interruption of transmission and reception on the sidelink may allowed only within $T_{BWPswitchDelayRRC}$.

When the network does not transmit, to the UE, information (e.g., bwp-SwitchStartTime) about the start time ($T_{BWPstartDelay}$) of NR Uu BWP switching from the time when the reception of RRC signal from the network is finished, or when there is no related configuration, interruption of transmission and reception on the sidelink may be allowed only within RRC processing time delay (e.g. $T_{RRCprocessingDelay}$)+$T_{BWPswitchDelayRRC}$.

When NR Uu BWP switching is performed based on DCI or based on timer, interruption of transmission/reception for the NR sidelink (SL) may be allowed only within $T_{BWPswitchDelay}$, which is a DCI-based or timer-based BWP switching time delay.

When the network transmits, to the UE, information (e.g., bwp-SwitchStartTime) on the start time ($T_{BWPstartDelay}$) of the NR BWP switching from the time when the reception of RRC signal from the network is finished, in order to reduce transmission/reception loss caused by RRC-based NR BWP switching For this purpose, interruption of transmission and reception with the serving cell may be permitted only within the $T_{BWPswitchDelayRRC}$.

When the network does not transmit, to the UE, information (e.g., bwp-SwitchStartTime) on the start time ($T_{BWPstartDelay}$) of the NR BWP switching from the time when the reception of RRC signal from the network is finished, or when there is no related configuration, interruption of transmission and reception with the serving cell may be permitted only within the RRC processing time delay (e.g., $T_{RRCprocessingDelay}$)+$T_{BWPswitchDelayRRC}$.

IV. Devices in General to which the Disclosure of the Present Specification May be Applied The disclosures of the present specification described so far may be implemented through various means. For example, the disclosures of the present specification may be implemented by hardware, firmware, software, or a combination thereof. Specifically, it will be described with reference to the drawings.

Figure 18:
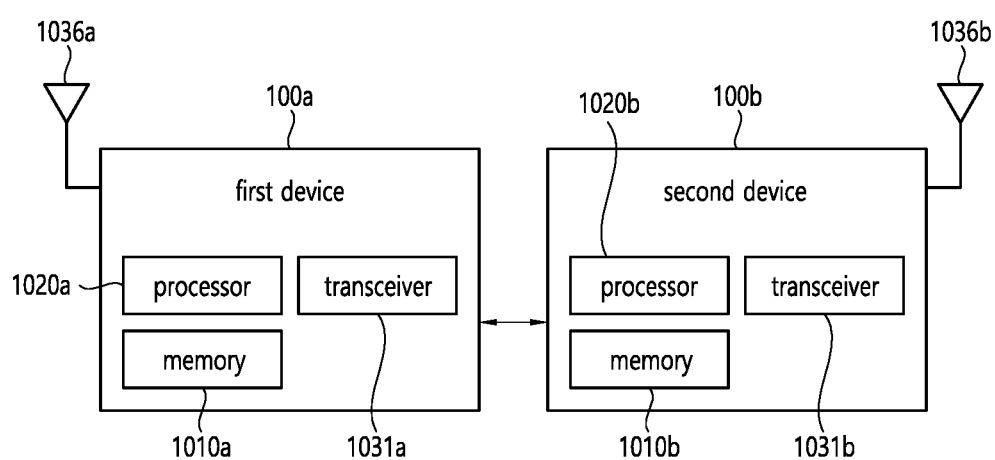
FIG. 18 shows an apparatus according to an embodiment.

FIG. 18 shows an apparatus according to an embodiment.

Referring to FIG. 18, a wireless communication system may include a first device (100a) and a second device (100b).

The first device (100a) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The second device (100b) is a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), Artificial Intelligence (AI) Module, Robot, AR (Augmented Reality) Device, VR (Virtual Reality) Device, MR (Mixed Reality) Device, Hologram Device, Public Safety Device, MTC Device, IoT Device, Medical Device, Fin tech device (or financial device), a security device, a climate/environment device, a device related to 5G services, or other devices related to the 4th industrial revolution field.

The first device (100a) includes at least one processor, such as a processor (1020a), and at least one memory, such as a memory (1010a), it may include at least one transceiver, such as transceiver (1031a). The processor (1020a) may perform the functions, procedures, and/or methods described above. The processor (1020a) may perform one or more protocols. For example, the processor (1020a) may perform one or more layers of an air interface protocol. The memory (1010a) is connected to the processor (1020a) and may store various types of information and/or commands. The transceiver (1031a) may be connected to the processor (1020a) and may be controlled to transmit/receive a wireless signal.

The second device (100b) may include at least one processor such as a processor (1020b), at least one memory device such as a memory (1010b), and at least one transceiver such as a transceiver (1031b). The processor (1020b) may perform the functions, procedures, and/or methods described above. The processor (1020b) may implement one or more protocols. For example, the processor (1020b) may implement one or more layers of an air interface protocol. The memory (1010b) is connected to the processor (1020b) and may store various types of information and/or commands. The transceiver (1031b) may be connected to the processor (1020b) and may be controlled to transmit/receive a wireless signal.

The memory (1010a) and/or the memory (1010b) may be respectively connected inside or outside the processor (1020a) and/or the processor (1020b), and may be connected to other processors through various technologies such as wired or wireless connection.

The first device (100a) and/or the second device (100b) may have one or more antennas. For example, antenna (1036a) and/or antenna (1036b) may be configured to transmit and receive wireless signals.

Figure 19:
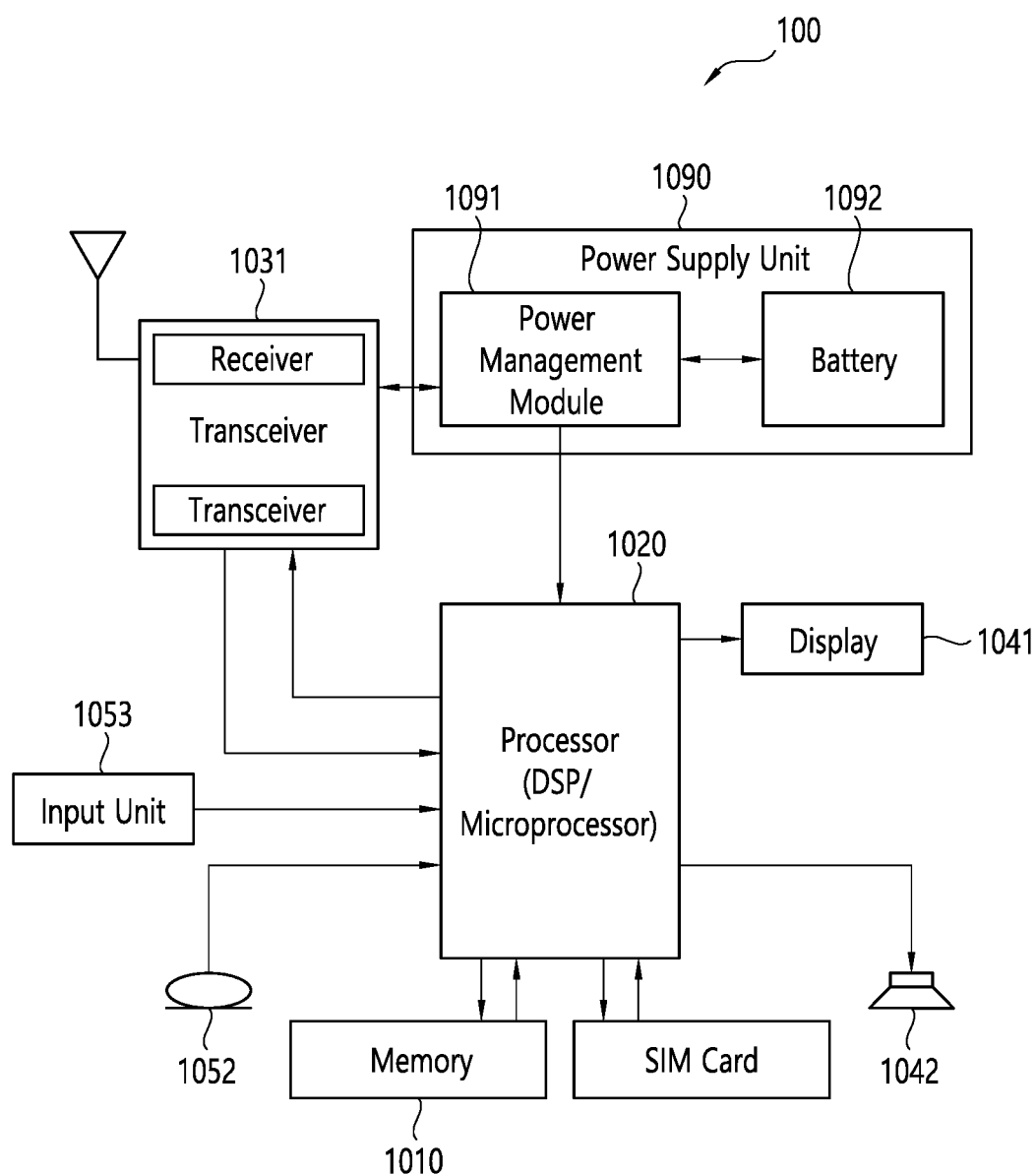
FIG. 19 is a block diagram illustrating the configuration of a terminal according to an embodiment.

FIG. 19 is a block diagram illustrating the configuration of a terminal according to an embodiment.

In particular, FIG. 19 is a diagram illustrating the apparatus of FIG. 18 in more detail above.

The device includes a memory (1010), a processor (1020), a transceiver (1031), a power management module (1091), a battery (1092), a display (1041), an input unit (1053), a speaker (1042) and a microphone (1052), SIM (subscriber identification module) card, and one or more antennas.

The processor (1020) may be configured to implement the proposed functions, procedures and/or methods described herein. The layers of the air interface protocol may be implemented in the processor (1020). The processor (1020) may include an application-specific integrated circuit (ASIC), other chipsets, logic circuits, and/or data processing devices. The processor (1020) may be an AP (application processor). The processor (1020) may include at least one of a DSP (digital signal processor), a CPU (central processing unit), a GPU (graphics processing unit), and a modem (modulator and demodulator). Examples of processor (1020) include SNAPDRAGON™ series processors manufactured by Qualcomm®, EXYNOS™ series processors manufactured by Samsung®, A series processors manufactured by Apple®, HELIO™ series processors manufactured by MediaTek®, ATOM™ series processor manufactured by INTEL® or a corresponding next-generation processor.

The power management module (1091) manages power for the processor (1020) and/or the transceiver (1031). The battery (1092) supplies power to the power management module (1091). The display (1041) outputs the result processed by the processor (1020). Input (1053) receives input to be used by processor (1020). The input unit (1053) may be displayed on the display (1041). A SIM card is an integrated circuit used to securely store an IMSI (international mobile subscriber identity) and associated keys used to identify and authenticate subscribers in mobile phone devices such as mobile phones and computers. Many SIM cards can also store contact information.

The memory (1010) is operatively coupled to the processor (1020), and stores various information for operating the processor (610). Memory (1010) may include ROM (read-only memory), RAM (random access memory), flash memory, memory cards, storage media, and/or other storage devices. When the embodiment is implemented in software, the techniques described in this specification may be implemented in modules (e.g., procedures, functions, etc.) that perform the functions described in this specification. Modules may be stored in memory (1010) and executed by processor (1020). The memory (1010) may be implemented inside the processor (1020). Alternatively, the memory (1010) may be implemented outside the processor (1020), and may be communicatively connected to the processor (1020) through various means known in the art.

The transceiver (1031) is operatively coupled to the processor (1020) and transmits and/or receives a radio signal. The transceiver (1031) includes a transmitter and a receiver. The transceiver (1031) may include a baseband circuit for processing a radio frequency signal. The transceiver controls one or more antennas to transmit and/or receive radio signals. The processor (1020) transmits command information to the transceiver (1031) to transmit, for example, a radio signal constituting voice communication data to initiate communication. The antenna functions to transmit and receive radio signals. When receiving a wireless signal, the transceiver (1031) may transmit the signal for processing by the processor (1020) and convert the signal to a baseband. The processed signal may be converted into audible or readable information output through the speaker (1042).

The speaker (1042) outputs sound related results processed by the processor (1020). Microphone (1052) receives sound related input to be used by processor (1020).

The user inputs command information such as a phone number by, for example, pressing (or touching) a button of the input unit (1053) or voice activation using the microphone (1052). The processor (1020) receives such command information and processes it to perform an appropriate function, such as making a call to a phone number. Operational data may be extracted from the SIM card or the memory (1010). In addition, the processor (1020) may display command information or display information on the display (1041) for the user to recognize and for convenience.

Figure 20:
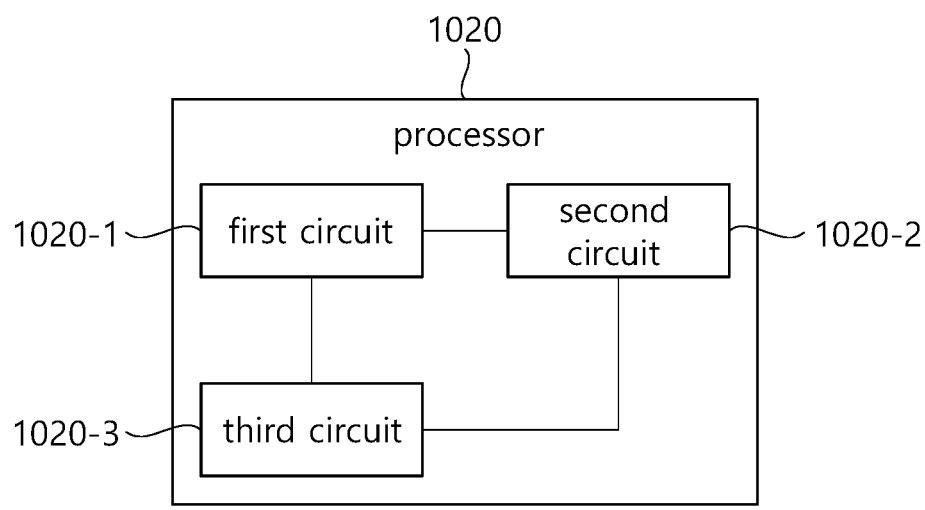
FIG. 20 shows a block diagram of a processor in which the disclosure of the present specification is implemented.

FIG. 20 shows a block diagram of a processor in which the disclosure of the present specification is implemented.

As can be seen with reference to FIG. 20, in order that the proposed functions, procedures and/or methods described in the disclosure of this specification is implemented, a processor (1020) may include a plurality of circuitry. For example, the processor (1020) may include a first circuit (1020-1), a second circuit (1020-2), and a third circuit (1020-3). Also, although not shown, the processor (1020) may include more circuits. Each circuit may include a plurality of transistors.

The first circuit 1020-1 may receive information on bandwidth part (BWP) switching timing from the base station.

The second circuit 1020-2 may perform BWP switching based on the information on the BWP switching timing.

The information on the BWP switching timing may include information on time point when the UE should start the BWP switching, the time point is after the information on BWP switching timing is received.

The information on the BWP switching timing may be received through a downlink control information (DCI) or a radio resource control (RRC) signal.

The information on the BWP switching timing includes: i) first information on when the UE should start switching to BWP for sidelink and ii) second information on when the UE should start switching to the BWP for the Uu link with the base station.

The step of performing BWP switching comprises: performing switching to BWP for sidelink; and performing switching to BWP for Uu link with the base station.

The UE may stop transmission and reception with the base station for specific time, the BWP switching is performed The specific time is included in BWP time delay ($T_{SLBWPswitchingDelay}$).

The processor 1020 may be referred to as an application-specific integrated circuit (ASIC) or an application processor (AP), and includes at least one of a digital signal processor (DSP), a central processing unit (CPU), and a graphics processing unit (GPU). can do.

Figure 21:
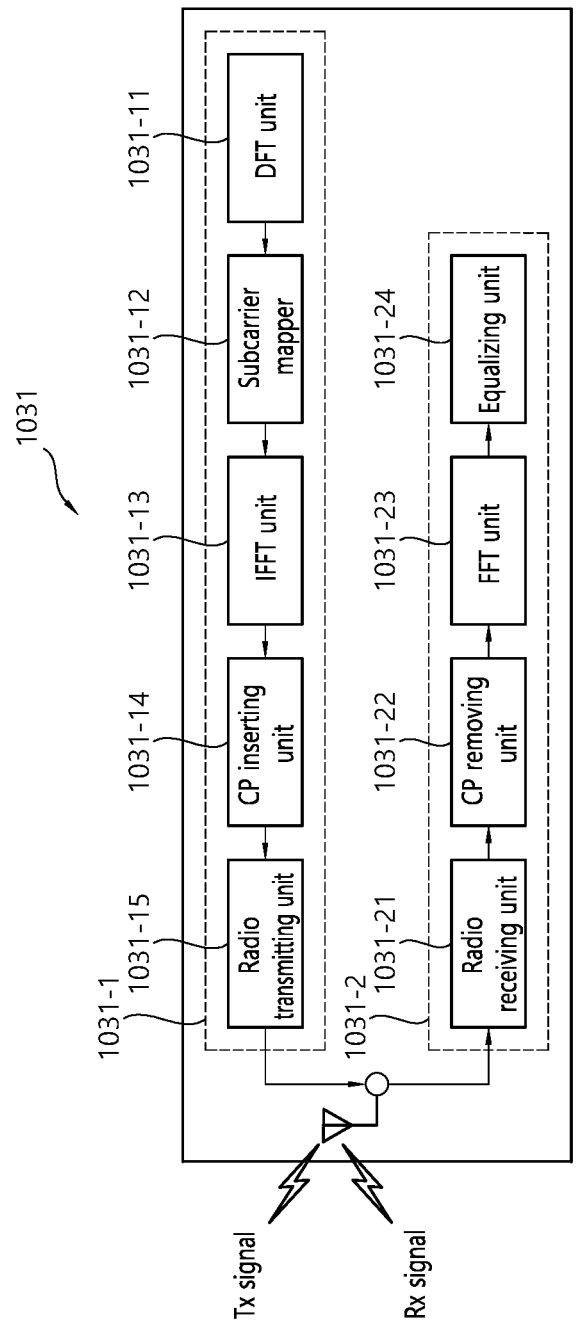
FIG. 21 is a detailed block diagram illustrating the transceiver of the first device shown in FIG. 18 or the transceiver of the device shown in FIG. 19 in detail.

FIG. 21 is a detailed block diagram illustrating the transceiver of the first device shown in FIG. 18 or the transceiver of the device shown in FIG. 19 in detail.

Referring to FIG. 21, the transceiver (1031) includes a transmitter (1031-1) and a receiver (1031-2). The transmitter (1031-1) includes a Discrete Fourier Transform (DFT) unit (1031-11), a subcarrier mapper (1031-12), an IFFT unit (1031-13) and a CP insertion unit (1031-14), and a wireless transmitter (1031-15). The transmitter (1031-1) may further include a modulator. In addition, for example, a scramble unit (not shown; scramble unit), a modulation mapper (not shown; modulation mapper), a layer mapper (not shown; layer mapper) and a layer permutator (not shown; layer permutator) may be further included, this may be disposed before the DFT unit (1031-11). That is, in order to prevent an increase in PAPR (peak-to-average power ratio), the transmitter (1031-1) passes information through the DFT (1031-11) before mapping a signal to a subcarrier. After subcarrier mapping is performed on the signal spread (or precoded in the same sense) by the DFT unit (1031-11) through the subcarrier mapper (1031-12), an IFFT (Inverse Fast Fourier Transform) unit (1031-13) to make it a signal on the time axis.

The DFT unit (1031-11) outputs complex-valued symbols by performing DFT on input symbols. For example, when Ntx symbols are input (however, Ntx is a natural number), the DFT size is Ntx. The DFT unit (1031-11) may be called a transform precoder. The subcarrier mapper (1031-12) maps the complex symbols to each subcarrier in the frequency domain. The complex symbols may be mapped to resource elements corresponding to resource blocks allocated for data transmission. The subcarrier mapper (1031-12) may be referred to as a resource element mapper. The IFFT unit (1031-13) outputs a baseband signal for data that is a time domain signal by performing IFFT on an input symbol. The CP insertion unit (1031-14) copies a part of the rear part of the base band signal for data and inserts it into the front part of the base band signal for data. ISI (Inter-symbol interference) and ICI (Inter-Carrier Interference) are prevented through CP insertion, so that orthogonality can be maintained even in a multi-path channel.

On the other hand, the receiver (1031-2) includes a radio receiver (1031-21), a CP remover (1031-22), an FFT unit (1031-23), and an equalizer (1031-24). The radio receiving unit (1031-21), the CP removing unit (1031-22), and the FFT unit (1031-23) of the receiver (1031-2) include the radio transmitting unit (1031-15) in the transmitting end (1031-1), It performs the reverse function of the CP insertion unit (1031-14) and the IFF unit (1031-13). The receiver (1031-2) may further include a demodulator.

V. Examples to which the Disclosure of the Present Specification can be Applied

Although not limited thereto, the various descriptions, functions, procedures, suggestions, methods, and/or flow charts of the disclosure of the present specification disclosed may be applied in various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 22:
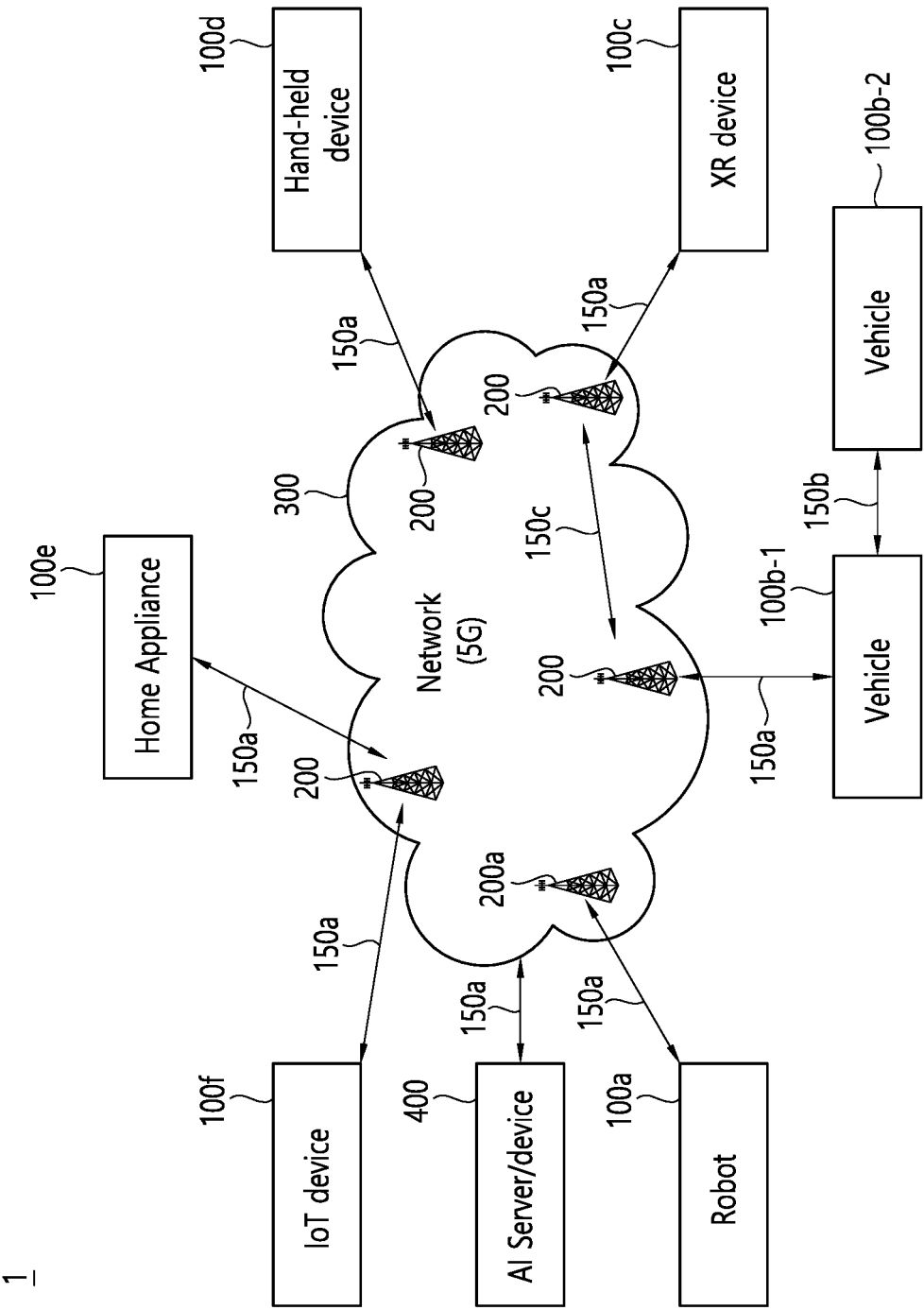
FIG. 22 illustrates a communication system 1 applied to the disclosure of the present specification.

FIG. 22 illustrates a communication system 1 applied to the disclosure of the present specification.

Referring to FIG. 22, a communication system (1) applied to the disclosure of the present specification includes a wireless device, a base station, and a network. Here, the wireless device may mean a device that performs communication using a wireless access technology (e.g., 5G NR (New RAT), LTE (Long Term Evolution)), and may be referred to as a communication/wireless/5G device. Although not limited thereto, the wireless device may include a robot (100a), a vehicle (100b-1, 100b-2), an XR (eXtended Reality) device (100c), a hand-held device (100d, and a home appliance (100e), an IoT (Internet of Thing) device (100f), and an AI device/server (400). For example, the vehicle may include a vehicle equipped with a wireless communication function, an autonomous driving vehicle, a vehicle capable of performing inter-vehicle communication, and the like. Here, the vehicle may include an UAV (Un-manned Aerial Vehicle) (e.g., a drone). XR devices include AR (Augmented Reality)/VR (Virtual Reality)/MR (Mixed Reality) devices, and include a HMD (Head-Mounted Device), a HUD (Head-Up Display) provided in a vehicle, a television, a smartphone, It may be implemented in the form of a computer, a wearable device, a home appliance, a digital signage, a vehicle, a robot, and the like. The portable device may include a smart phone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device (200a) may operate as a base station/network node to other wireless devices.

The wireless devices (100a-100f) may be connected to the network (300) through the base station (200). AI (Artificial Intelligence) technology may be applied to the wireless devices (100a-100f), and the wireless devices (100a-100f) may be connected to the AI server (400) through the network (300). The network (300) may be configured using a 3G network, a 4G (e.g., LTE) network, or a 5G (e.g., NR) network. The wireless devices (100a-100f) may communicate with each other through the base station (200)/network (300), but may also communicate directly (e.g. sidelink communication) without passing through the base station/network. For example, the vehicles (100b-1, 100b-2) may perform direct communication (e.g. Vehicle to Vehicle (V2V)/Vehicle to everything (V2X) communication). In addition, the IoT device (e.g., sensor) may directly communicate with other IoT devices (e.g., sensor) or other wireless devices (100a-100f).

Wireless communication/connection (150a, 150b, and 150c) may be performed between the wireless devices (100a-100f)/base station (200) and the base station (200)/base station (200). Here, the wireless communication/connection includes uplink/downlink communication (150a) and sidelink communication (150b) (or D2D communication), and communication between base stations (150c) (e.g. relay, IAB (Integrated Access Backhaul)). This can be done through technology (e.g. 5G NR) Wireless communication/connection (150a, 150b, 150c) allows the wireless device and the base station/radio device, and the base station and the base station to transmit/receive wireless signals to each other. For example, the wireless communication/connection (150a, 150b, and 150c) may transmit/receive a signal through various physical channels. To this end, based on various proposals of the present specification, At least some of various configuration information setting process for transmission/reception of a wireless signal (e.g., channel encoding/decoding, modulation/demodulation, resource mapping/demapping, etc.), resource allocation process and etc. may be performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. have. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method for communication, performed by a UE (user equipment), comprising:
performing sidelink communication;
performing Uu link communication with a base station;
performing BWP (bandwidth part) switching between the sidelink communication and the Uu link communication,
wherein the BWP switching is operated based on the sidelink communication and the Uu link communication being operated in a same carrier for TDM (Time Division Multiplexing), and
wherein the UE skips performing the sidelink communication during a delay by the BWP switching; and
receiving information on BWP switching timing from the base station;
wherein the BWP switching is operated based on the information on BWP switching timing,
wherein the information on BWP switching timing includes information on time point when the UE should start the BWP switching, the time point is after the information on BWP switching timing is received, and
wherein the information on BWP switching timing includes i) first information on when the UE should start switching to BWP for sidelink and ii) second information on when the UE should start switching to the BWP for the Uu link with the base station.

2. The method of claim 1,
wherein the information on BWP switching timing is received through DCI (downlink control information) or RRC (radio resource control) signal.

3. The method of claim 1, wherein the step of performing the BWP switching comprises:
performing switching to BWP for sidelink; and
performing switching to BWP for Uu link with the base station.

4. A communication device comprising:
at least one processor; and
at least one memory for storing instructions and operably electrically connectable with the at least one processor, wherein based on the instructions being executed by the at least one processor, the at least one processor performs operations comprising:
performing sidelink communication;
performing Uu link communication with a base station;
performing BWP (bandwidth part) switching between the sidelink communication and the Uu link communication,
wherein the BWP switching is operated based on the sidelink communication and the Uu link communication being operated in a same carrier for TDM (Time Division Multiplexing), and
wherein the UE skips performing the sidelink communication during a delay by the BWP switching; and
receiving information on BWP switching timing from the base station;
wherein the BWP switching is operated based on the information on BWP switching timing,
wherein the information on BWP switching timing includes information on time point when the device should start the BWP switching, the time point is after the information on BWP switching timing is received, and
wherein the information on BWP switching timing includes i) first information on when the device should start switching to BWP for sidelink and ii) second information on when the device should start switching to the BWP for the Uu link with the base station.

5. The device of claim 4, wherein the step of performing BWP switching comprises:
performing switching to BWP for sidelink; and
performing switching to BWP for Uu link with the base station.

6. The device of claim 4,
wherein the information on BWP switching timing is received through DCI (downlink control information) or RRC (radio resource control) signal.

7. A chipset equipped in a communication device, comprising:
at least one processor;
at least one memory for storing instructions and operably electrically connectable with the at least one processor, wherein based on the instructions being executed by the at least one processor, the at least one processor performs operations comprising:
performing sidelink communication;
performing Uu link communication with a base station;
performing BWP (bandwidth part) switching between the sidelink communication and the Uu link communication,
wherein the BWP switching is operated based on the sidelink communication and the Uu link communication being operated in a same carrier for TDM (Time Division Multiplexing), and
wherein the UE skips performing the sidelink communication during a delay by the BWP switching; and
receiving information on BWP switching timing from the base station;
wherein the BWP switching is operated based on the information on BWP switching timing,
wherein the information on BWP switching timing includes information on time point when the communication device should start the BWP switching, the time point is after the information on BWP switching timing is received, and
wherein the information on BWP switching timing includes i) first information on when the communication device should start switching to BWP for sidelink and ii) second information on when the communication device should start switching to the BWP for the Uu link with the base station.

* * * * *